(12) United States Patent
Martin

(10) Patent No.: US 12,249,822 B2
(45) Date of Patent: Mar. 11, 2025

(54) ELECTRICAL CABLE HANGERS

(71) Applicant: Hubbell Incorporated, Shelton, CT (US)

(72) Inventor: Evan Ronald Martin, Litchfield, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 18/120,306

(22) Filed: Mar. 10, 2023

(65) Prior Publication Data

US 2023/0420925 A1    Dec. 28, 2023

Related U.S. Application Data

(63) Continuation-in-part of application No. 29/843,962, filed on Jun. 24, 2022, now Pat. No. Des. 1,007,286, (Continued)

(51) Int. Cl.
| | |
|---|---|
| *H02G 7/05* | (2006.01) |
| *H02G 3/32* | (2006.01) |
| *F16G 11/02* | (2006.01) |
| *F16L 3/06* | (2006.01) |
| *F16L 3/22* | (2006.01) |

(Continued)

(52) U.S. Cl.
CPC ............... *H02G 7/053* (2013.01); *H02G 3/32* (2013.01); *F16G 11/02* (2013.01); *F16L 3/06* (2013.01); *F16L 3/221* (2013.01); *F16L 3/24* (2013.01); *H02G 3/0456* (2013.01); *H02G 3/26* (2013.01); *H02G 3/30* (2013.01)

(58) Field of Classification Search
CPC ........ H02G 7/053; H02G 3/32; H02G 3/0456; H02G 3/363; H02G 3/30; H02G 3/26; F16G 11/02; F16G 11/06; F16L 3/221; F16L 3/06; F16L 3/24
See application file for complete search history.

(56) References Cited

U.S. PATENT DOCUMENTS

| | | |
|---|---|---|
| 310,938 A | 1/1885 | Gilliland |
| 447,297 A | 3/1891 | Carpenter |

(Continued)

FOREIGN PATENT DOCUMENTS

| | | |
|---|---|---|
| CN | 305732000 | 4/2020 |
| DE | 1059998 | 6/1959 |

(Continued)

OTHER PUBLICATIONS

CAB Hooks, Hangers & Mine Safety Products Brochure, 2010 (24 pages).
Wiley Wire Management Solutions, 2014 (p. 1) and 2015 (pp. 2-6) (6 pages).
PCT/US2018036325 International Search Report and Written Opinion dated Sep. 19, 2018 (13 pages).
CAB Products Hooks and Hangers Brochure, Oct. 5, 2021 (1 page).
Commonly owned, co-pending Design U.S. Appl. No. 29/843,958, filed Jun. 24, 2022.
Commonly owned, co-pending Design U.S. Appl. No. 29/843,959, filed Jun. 24, 2022.

(Continued)

*Primary Examiner* — Tan Le
(74) *Attorney, Agent, or Firm* — Wissing Miller LLP

(57) ABSTRACT

A hanger for securing electrical cabling to a structure includes a cable holding portion provided at a distal end of the hanger for holding one or more cables to be secured and a hook-like portion provided at a proximal end of the hanger for receiving and securing the hanger to the structure, the hook-like portion having a first width dimensioned for receiving a portion of the structure and an opening having a width smaller than the first width.

16 Claims, 17 Drawing Sheets

Related U.S. Application Data and a continuation-in-part of application No. 29/843,959, filed on Jun. 24, 2022, now Pat. No. Des. 1,007,285, and a continuation-in-part of application No. 29/843,964, filed on Jun. 24, 2022, now Pat. No. Des. 1,008,006, and a continuation-in-part of application No. 29/843,966, filed on Jun. 24, 2022, now Pat. No. Des. 1,008,007.

(60) Provisional application No. 63/433,810, filed on Dec. 20, 2022.

(51) Int. Cl.
*F16L 3/24* (2006.01)
*H02G 3/00* (2006.01)
*H02G 3/04* (2006.01)
*H02G 3/30* (2006.01)

(56) References Cited

U.S. PATENT DOCUMENTS

| | | | |
|---|---|---|---|
| 837,185 A | 11/1906 | Brown | |
| 851,505 A * | 4/1907 | Ernst | |
| 499,549 A * | 6/1907 | Hunter et al. | |
| 887,578 A | 5/1908 | Beyer | |
| 927,032 A * | 7/1909 | Feiock | |
| 1,331,248 A | 2/1920 | Dissel | |
| 1,333,692 A | 3/1920 | Wester | |
| 1,336,558 A | 4/1920 | Bancroft | |
| 1,373,164 A | 3/1921 | Brenizer | |
| 1,516,024 A | 11/1924 | Meyer | |
| 1,841,479 A | 1/1932 | Jessen | |
| 1,869,407 A | 8/1932 | Brenizer | |
| 1,875,697 A | 9/1932 | Blackburn | |
| 1,967,134 A | 7/1934 | Short | |
| 2,106,006 A | 1/1938 | Klein | |
| 2,122,925 A | 7/1938 | Bins | |
| 2,172,174 A | 9/1939 | Pierson | |
| 2,384,440 A | 9/1945 | Carr | |
| 2,718,545 A | 9/1955 | Thurman | |
| 2,744,707 A | 5/1956 | Peterson | |
| 2,934,594 A | 4/1960 | Flower | |
| 3,120,044 A | 2/1964 | Piano | |
| 3,136,515 A | 6/1964 | Potruch | |
| 3,219,302 A | 11/1965 | Smith et al. | |
| 3,263,026 A | 7/1966 | Kihs | |
| 3,504,108 A | 3/1970 | Kihs | |
| 3,878,590 A | 4/1975 | Bolger | |
| 3,883,934 A | 5/1975 | Rochfort | |
| 4,099,299 A | 7/1978 | Bruggert et al. | |
| 4,232,847 A | 11/1980 | Cooper | |
| 4,245,806 A | 1/1981 | Vangreen | |
| D263,021 S | 2/1982 | Siegfried | |
| 4,407,472 A | 10/1983 | Beck | |
| D283,786 S | 5/1986 | Chap | |
| D283,787 S | 5/1986 | Chap | |
| 4,669,422 A | 6/1987 | Steudler, Jr. | |
| 4,742,979 A | 5/1988 | Syversten et al. | |
| 4,795,856 A | 1/1989 | Farmer | |
| D300,804 S | 4/1989 | Myers | |
| D301,807 S | 6/1989 | Friedman | |
| 4,840,333 A | 6/1989 | Nakayama | |
| 4,979,712 A | 12/1990 | Rios | |
| D317,388 S | 6/1991 | White | |
| 5,021,612 A | 6/1991 | Joffe | |
| 5,039,366 A * | 8/1991 | Strattman | F16G 11/06 24/304 |
| 5,051,103 A | 9/1991 | Neuroth | |
| 5,054,728 A | 10/1991 | Nigro, Jr. | |
| 5,303,885 A | 4/1994 | Wade | |
| D357,402 S | 4/1995 | Roethler | |
| 5,531,410 A | 7/1996 | Simon | |
| 5,577,699 A | 11/1996 | Gardner et al. | |
| 5,651,521 A | 7/1997 | Aberg | |
| D387,652 S | 12/1997 | Carlson, Jr. | |
| D396,371 S | 7/1998 | Oliver | |
| D423,337 S | 4/2000 | Laga et al. | |
| D423,916 S | 5/2000 | Kalat | |
| D433,930 S | 11/2000 | Kalat | |
| D434,309 S | 11/2000 | Kalat | |
| D434,310 S | 11/2000 | Kalat | |
| 6,161,804 A | 12/2000 | Paske et al. | |
| D442,075 S | 5/2001 | Lay et al. | |
| 6,364,266 B1 * | 4/2002 | Garvin | F16L 3/02 248/303 |
| 6,375,141 B1 | 4/2002 | Kettlestrings | |
| D457,931 S | 5/2002 | Kalat | |
| 6,565,048 B1 | 5/2003 | Meyer | |
| D494,842 S | 8/2004 | Perkins et al. | |
| D499,956 S | 12/2004 | Wall | |
| D502,865 S | 3/2005 | Anderson et al. | |
| D516,413 S | 3/2006 | Anderson et al. | |
| 7,175,147 B1 | 2/2007 | Marks | |
| D541,139 S | 4/2007 | Jackson | |
| D545,669 S | 7/2007 | Hall | |
| 7,304,240 B1 | 12/2007 | Gretz | |
| D570,294 S | 6/2008 | Newcomb | |
| D581,771 S | 12/2008 | Ernst et al. | |
| D591,143 S | 4/2009 | Ernst et al. | |
| D600,102 S | 9/2009 | Larkin | |
| 7,748,675 B2 | 7/2010 | Nestor et al. | |
| D637,893 S | 5/2011 | Yon | |
| D648,208 S | 11/2011 | Platt | |
| D651,066 S | 12/2011 | Johnson, III | |
| D661,574 S | 6/2012 | Platt | |
| 8,191,845 B1 | 6/2012 | Yu | |
| D668,938 S | 10/2012 | Morales | |
| D672,228 S | 12/2012 | Hendricks | |
| 8,387,292 B1 | 3/2013 | Rasmus | |
| 8,398,034 B2 | 3/2013 | Lambert et al. | |
| D695,526 S | 12/2013 | Easlick | |
| D702,540 S | 4/2014 | Kacines | |
| 8,783,628 B2 | 7/2014 | Jette | |
| D734,134 S | 7/2015 | Bauerle | |
| D756,756 S | 5/2016 | Kuehn | |
| D767,978 S | 10/2016 | Kusmirek | |
| 9,800,028 B1 | 10/2017 | Smith et al. | |
| D806,240 S | 12/2017 | Smith et al. | |
| 10,082,225 B1 | 9/2018 | Ramsey | |
| D863,905 S | 10/2019 | Dankert | |
| D872,565 S | 1/2020 | Hendrickson | |
| D874,906 S | 2/2020 | Ruddick et al. | |
| D878,192 S | 3/2020 | Markusic et al. | |
| 10,670,170 B2 | 6/2020 | Shea et al. | |
| 10,837,577 B2 | 11/2020 | Arbuckle | |
| D911,826 S | 3/2021 | Maynard | |
| D913,777 S | 3/2021 | Liu | |
| D919,417 S | 5/2021 | Wedding et al. | |
| D919,418 S | 5/2021 | Wedding et al. | |
| D922,182 S | 6/2021 | Wedding et al. | |
| D930,461 S | 9/2021 | Wedding et al. | |
| D940,541 S | 1/2022 | Stubben et al. | |
| D941,129 S | 1/2022 | Chen | |
| D945,253 S | 3/2022 | Stubben et al. | |
| D945,864 S | 3/2022 | Stubben et al. | |
| D949,112 S | 4/2022 | Wedding et al. | |
| D957,237 S | 7/2022 | Zhang | |
| D967,700 S | 10/2022 | Sun | |
| D967,701 S | 10/2022 | Huang | |
| 11,569,646 B2 | 1/2023 | Smith et al. | |
| D982,420 S | 4/2023 | Hu | |
| D983,148 S | 4/2023 | Wedding et al. | |
| D993,736 S | 8/2023 | Dees | |
| 11,817,817 B2 | 11/2023 | Wedding et al. | |
| 2002/0066833 A1 | 6/2002 | Ferrill et al. | |
| 2003/0178535 A1 | 9/2003 | Jette | |
| 2005/0069398 A1 | 3/2005 | Arbuckle | |
| 2005/0087662 A1 | 4/2005 | Jacobs | |
| 2006/0016943 A1 | 1/2006 | Thompson | |
| 2008/0272269 A1 | 11/2008 | Moravsky | |
| 2009/0101763 A1 | 4/2009 | Newcomb et al. | |
| 2011/0303799 A1 | 12/2011 | Blanchard | |
| 2015/0377388 A1 | 12/2015 | Thackeray | |

(56) References Cited

U.S. PATENT DOCUMENTS

| | | |
|---|---|---|
| 2016/0153587 A1 | 6/2016 | Smith et al. |
| 2018/0034252 A1* | 2/2018 | Smith .................... F16L 3/223 |
| 2018/0233888 A1 | 8/2018 | Smith et al. |
| 2022/0038046 A1 | 2/2022 | Wedding et al. |
| 2022/0060006 A1 | 2/2022 | Naugler |
| 2022/0190577 A1 | 6/2022 | Worden |

FOREIGN PATENT DOCUMENTS

| | | | |
|---|---|---|---|
| DE | 7522285 | 11/1975 | |
| EM | 015016294-0001 | 4/2023 | |
| EP | 1136759 A2 * | 9/2001 | .............. F24C 14/00 |
| GB | 1207741 A | 10/1970 | |
| JP | 11205963 A | 7/1999 | |
| JP | D1166806 | 1/2003 | |
| JP | D1347091 | 11/2008 | |
| JP | D1726431 | 9/2022 | |
| KR | 300521274.0000 | 2/2009 | |
| KR | 300607139.0000 | 7/2011 | |
| KR | 300607140.0000 | 7/2011 | |
| KR | 101126429 | 3/2012 | |
| KR | 300642559.0000 | 4/2012 | |
| KR | 300650487.0000 | 6/2012 | |
| KR | 300670382.0000 | 11/2012 | |
| KR | 20130136951 | 12/2013 | |
| KR | 300775616.0000 | 2/2014 | |
| KR | 3020140000111 | 2/2014 | |
| KR | 300796244.0000 | 5/2015 | |
| KR | 300800088.0000 | 6/2015 | |
| KR | 20170022693 | 3/2017 | |
| KR | 20230118353 | 8/2023 | |
| WO | 2012108564 | 8/2012 | |

OTHER PUBLICATIONS

Commonly owned, co-pending Design U.S. Appl. No. 29/843,962, filed Jun. 24, 2022.
Commonly owned, co-pending Design U.S. Appl. No. 29/843,964, filed Jun. 24, 2022.
Commonly owned, co-pending Design U.S. Appl. No. 29/843,966, filed Jun. 24, 2022.
Commonly owned, co-pending Design U.S. Appl. No. 29/855,363, filed Oct. 1, 2022.
Commonly owned, co-pending Design U.S. Appl. No. 29/850,677, filed Aug. 22, 2022.
Commonly owned, co-pending Design U.S. Appl. No. 29/883,447, filed Jan. 30, 2023.
Commonly owned, co-pending U.S. Appl. No. 18/197,599, filed May 15, 2023.
Commonly owned, co-pending Design U.S. Appl. No. 29/843,957, filed Jun. 24, 2022.
Enterprises 6185, by UnbeatableSale on amazon.com. Dated Jan. 31, 2012. https://www.amazon.com/Horizon-Manufacturing-Enterprises-6185-Large/dp/B007WC0YQ4. (1page).
Www.cabproducts.com/latchback-hangers/, Wayback Machine capture Aug. 27, 2014. (2 pages).
International Search Report and Written Opinion in corresponding International Application No. PCT/US2023/034292 mailed Feb. 2, 2024. (9 pages).
Wiley Catalog Cut Sheet, WCH—Wiley Cable Hanger Family, 2021. (1 page).

* cited by examiner

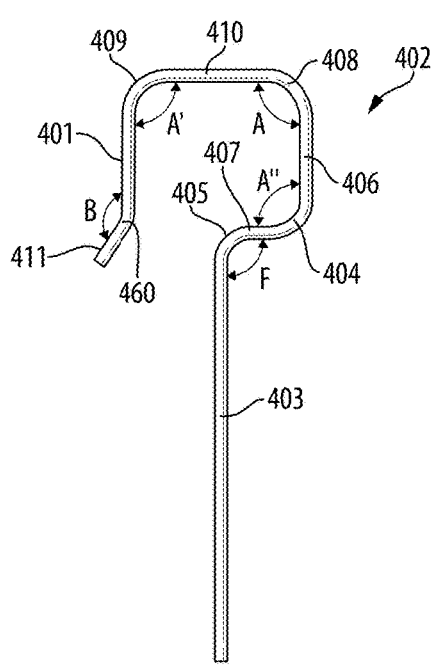
Fig. 14A
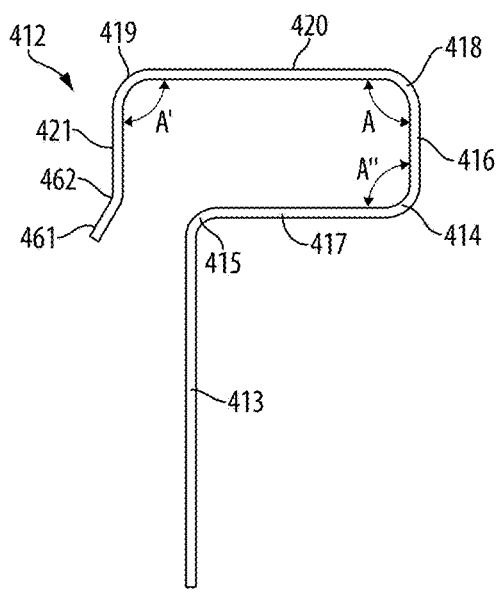
Fig. 14B
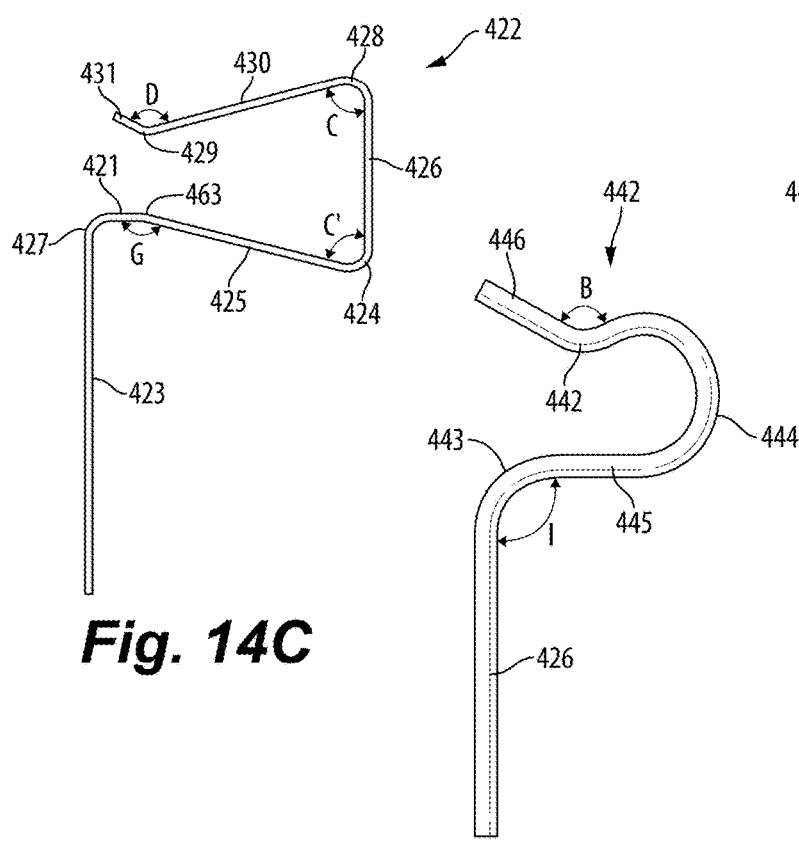
Fig. 14C
Fig. 14E
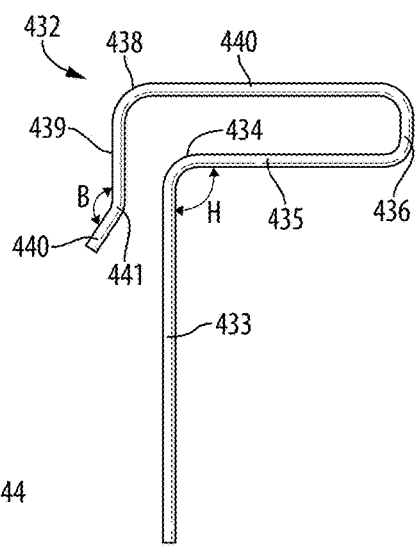
Fig. 14D

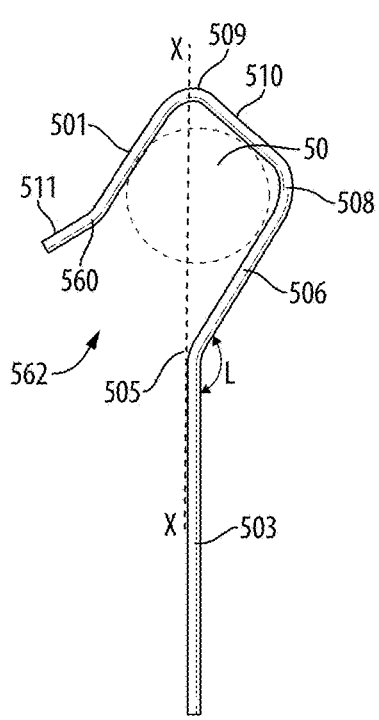
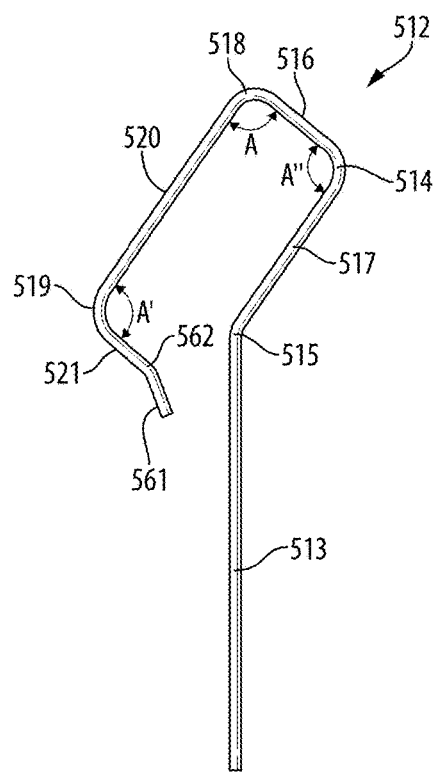
Fig. 15A
Fig. 15B
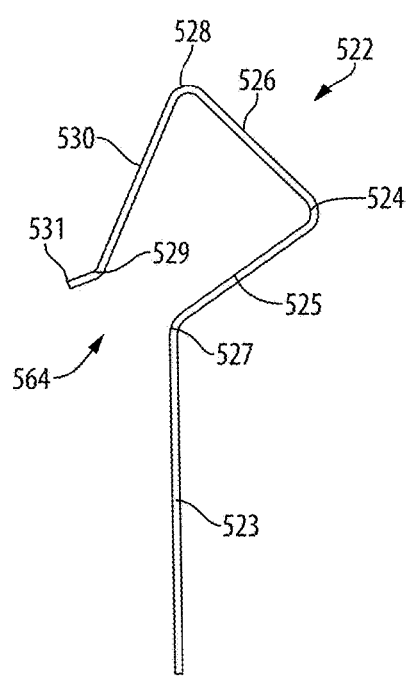
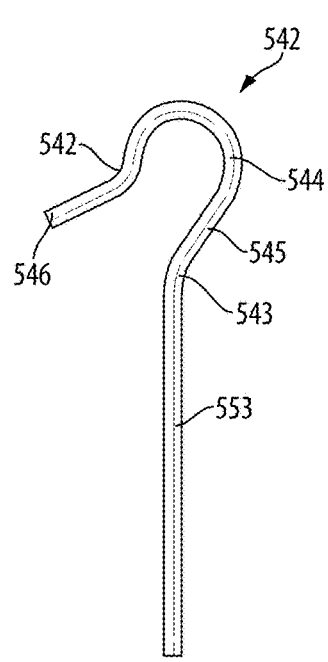
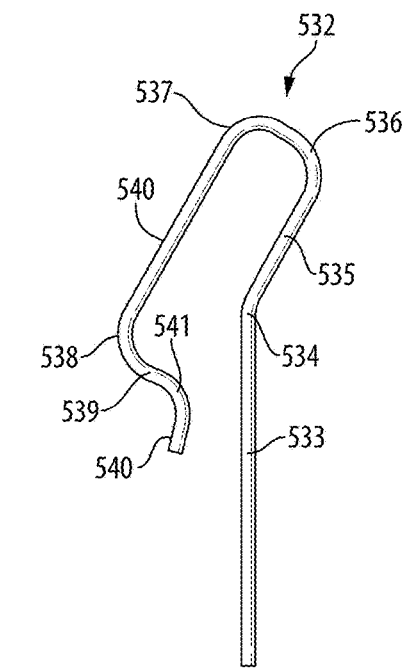
Fig. 15C
Fig. 15E
Fig. 15D

ELECTRICAL CABLE HANGERS

CROSS-REFERENCE TO RELATED APPLICATIONS

This application is based on and claims priority to U.S. Provisional Application Ser. No. 63/433,810 filed Dec. 20, 2022 entitled ELECTRICAL CABLE HANGERS and is a Continuation-in-part of Design application Ser. No. 29/843,959 filed Jun. 24, 2022 entitled CABLE HANGER, Design application Ser. No. 29/843,962 filed Jun. 24, 2022 entitled CABLE HANGER, Design application Ser. No. 29/843,964 filed Jun. 24, 2022 entitled CABLE HANGER and Design application Ser. No. 29/843,966 filed Jun. 24, 2022 entitled CABLE HANGER the contents of each of which are incorporated herein in their entirety by reference.

BACKGROUND

Field

The present disclosure relates generally to hangers and more specifically, to electrical cable hangers.

Description of the Related Art

Structures are often provided for supporting different types of systems which may include electrical systems, electrical components, cabling or wiring, etc. Often, electrical cabling or wiring is run to and from various parts of these systems utilizing one or more types of cable management systems.

For example, the use of photovoltaic arrays to provide electrical power in commercial, residential, and other environments has become more and more popular. Photovoltaic arrays are generally composed of a number of photovoltaic or solar modules and may be set within a support structure such as a metallic frame or rail system that supports the photovoltaic modules. The frame or rail system is attached to a structure such as a roof or the ground. When installing a photovoltaic array, a number of photovoltaic modules are assembled onto the frame or rail system. The metallic frames of the individual photovoltaic modules, and the structural pieces, e.g., the rails, on which the modules are mounted are generally made out of aluminum. Depending upon the size of the photovoltaic array, the rail system may include multiple metallic rails coupled or connected together in a grid-like pattern. To prevent shadowing on the solar panels, it is important that wires, electronic components, etc. remain away from the light receiving faces of the solar panels. This can be particularly difficult when solar panels which allow light to enter from the back and front (e.g., bi-facial installation) are utilized, since the cables and/or electrical components tend to hang or drape from the array, even when existing cable management systems are used. To ensure the integrity of cables running along the metal frames of the photovoltaic modules, the cables may be mounted to the metal frames using one or more of various types of wire management systems. The wire management systems provide neat, easy and efficient ways for connecting the cables to the support structure. Examples of cable management systems include various types of clips as well as various types of ties including twist ties, zip ties, hook and loop ties, crimped wire cable ties etc.

Maximizing energy production from photovoltaic arrays is important and is particularly important for utility-scale solar designers in order to provide a greater return on investment. One path to maximizing energy production involves the use of solar trackers which are used to expose the photovoltaic modules to more sun. Solar trackers when connected to the solar modules or arrays move the arrays to track the movement of the sun in the sky. In this way, the solar modules are always positioned to take optimum advantage for harvesting the sun's energy. Such solar trackers are often provided in between interconnected rows of solar modules which are themselves interconnected with one or more cables. The solar trackers generally require their own unique frames or support structures separate from those used to support the solar modules. These unique frames and support structures should also be capable of holding the cables from the interconnected solar modules as well as the cables used to power and control the solar trackers themselves, in a neat and efficient way. Because the solar trackers move the solar modules through various arcs and distances, the cables should be allowed some movement so as not to bind the system while still keeping the cables and wiring out of the way of moving parts to prevent pinching and out of the way of the solar modules to prevent shadowing.

Brackets or frames used to support solar tracking units and, in particular, utility scale solar tracking units, often utilize many different components including various types of brackets and are often provided in very specific configurations. While these brackets or frames may provide a firm secure support for the solar tracking unit, cables from the solar tracking unit and/or solar modules may be left hanging and subject to pinching and/or result in shadowing of the solar modules.

Existing cable management systems are generally not particularly well suited for use on all of the various types of brackets and frames utilized. For example, existing clips for attaching a cable to a bracket are not suitable for supporting the weight of the relatively large number of cables passing by the solar array and/or solar tracking unit and will tend to slip off the bracket because of their weight and the movement of the bracket as the solar tracking unit tracks the movement of the sun. The various types of ties currently being utilized provide limited support for the cable and tend to move and slide up and down the portion of the bracket to which they are attached as the bracket moves, which may end up causing the cables to be worn through exposing and/or damaging the inner wires.

A need exists for hangers for securely and reliably hanging and holding electrical cables to various types of structures.

SUMMARY

The present disclosure provides embodiments of electrical cable hangers for securing electrical components to structures.

According to an exemplary embodiment, a hanger for securing electrical cabling to a structure includes a cable holding portion provided at a distal end of the hanger for holding one or more cables to be secured and a hook-like portion provided at a proximal end portion of the hanger for securing to the structure.

According to another exemplary embodiment an electrical cable hanger for securing electrical cable to a structure includes a segment of spring steel comprising a proximal end, a distal end and an intermediate section between the proximal end and the distal end. The proximal end is configured to be hooked to the structure and the distal end is configured for holding the electrical cable.

According to another exemplary embodiment, an electrical cable management system includes a segment of spring steel rod including a proximal end portion configured to hook onto a portion of a frame and a distal end portion configured as a cable carrier for holding one or more cables.

According to another exemplary embodiment, an electrical cable management system includes a segment of spring steel rod including a proximal end portion, a distal end portion and an intermediate portion between the proximal end portion and the distal end portion, wherein the proximal end portion comprises a hook dimensioned to hook onto a first portion of a frame structure and the distal end portion comprises a cable carrier formation.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIGS. 14A-14E are front views of hook end sections of electrical cable hangers according to various illustrative embodiments of the present disclosure;

FIGS. 15A-15E are front views of hook end sections of electrical cable hangers according to various illustrative embodiments of the present disclosure.

DETAILED DESCRIPTION

The present disclosure provides embodiments of electrical cable hangers or supports for securing electrical wires and cables to a structure. By way of examples only, embodiments of the present disclosure will be described as being attached to a support structure such as a metal frame or rail upon which a solar array and/or solar tracking unit may be mounted. For ease of description, the support structure may be referred to interchangeably herein as frame, bracket or rail. The wires or cables referred to herein as being supported may be formed by one or more solid conductors and/or by one or more stranded conductors.

Electrical cable hangers according to exemplary embodiments of the present disclosure will be described as being formed from a material capable of assuming a particular shape and substantially retaining that shape. The material may be referred to herein as wire or rod. A non-limiting example of such material is spring steel. The spring steel may be in the form of a wire or rod having a substantially circular cross-section, although other cross-sectional shapes are contemplated. Alternatively, the spring steel may be in be in the form of a strip or sheet having a substantially rectangular cross-section. The wire selected may include round galvanized steel, round stainless steel, flat rolled galvanized steel, flat rolled stainless steel, etc. The spring steel may be coated with a suitable material to protect it from the environment. For example, the spring steel may be galvanized. Alternatively, other forms of environmentally protected materials such as stainless spring steel may be utilized. One or more portions of the material may be provided with a coating which is non-conductive and/or provides a higher coefficient of friction than the material itself. The gauge of the material is selected to be suitable for the size and/or number of cables to be held and generally may range between 6-18 gauge. Although embodiments of the present disclosure will be described as being formed from a single segment of wire, it will be appreciated the single segment may actually consist of two or more individual segments joined by weld, solder, crimp, etc. to form the single segment.

Figures 1, 1A:
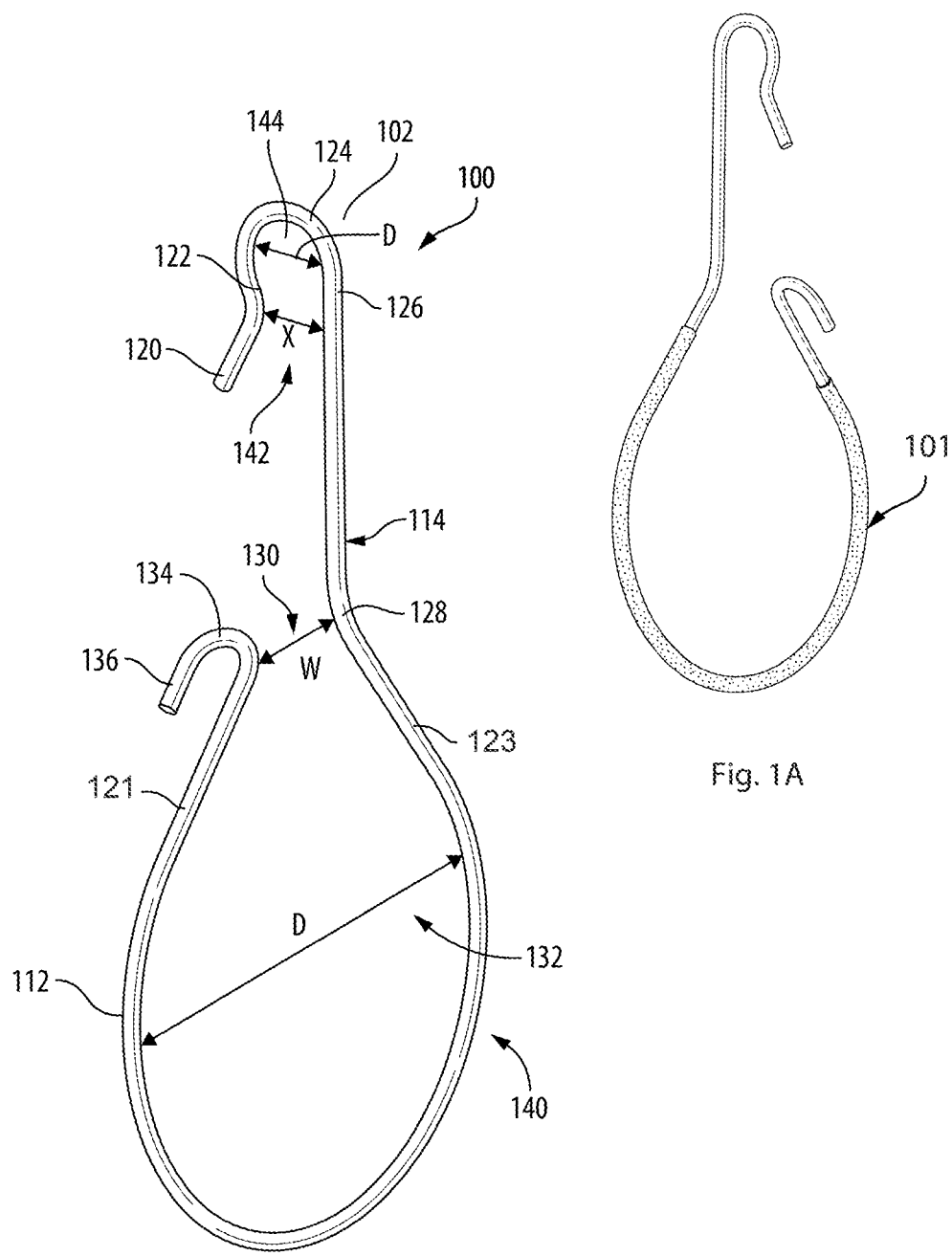
FIG. 1 is a perspective view of an electrical cable hanger according to another illustrative embodiment of the present disclosure.
FIG. 1A is a perspective view of the electrical cable hanger depicted in FIG. 1 including a coating provided on at least a portion of the hanger that contacts wires and/or cables.
Figure 2:
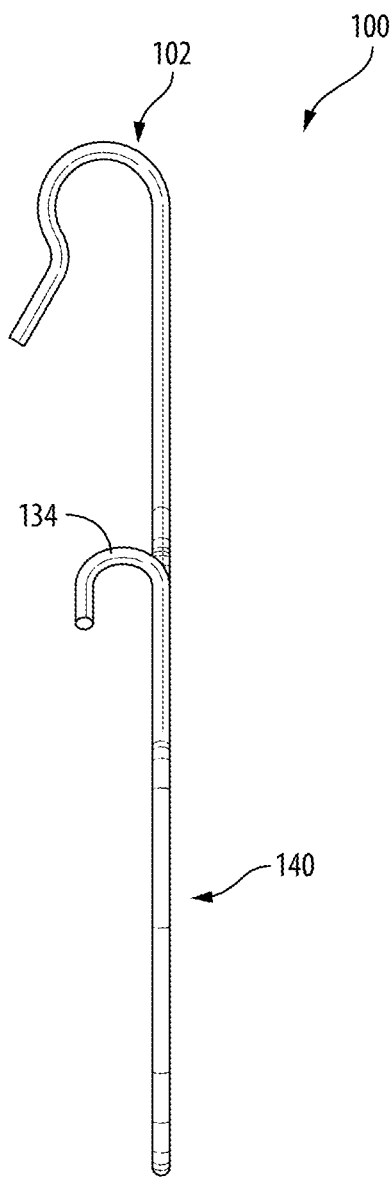
FIG. 2 is a side view of the electrical cable hanger according to the illustrative embodiment of the present disclosure depicted in FIG. 1.
Figure 3:
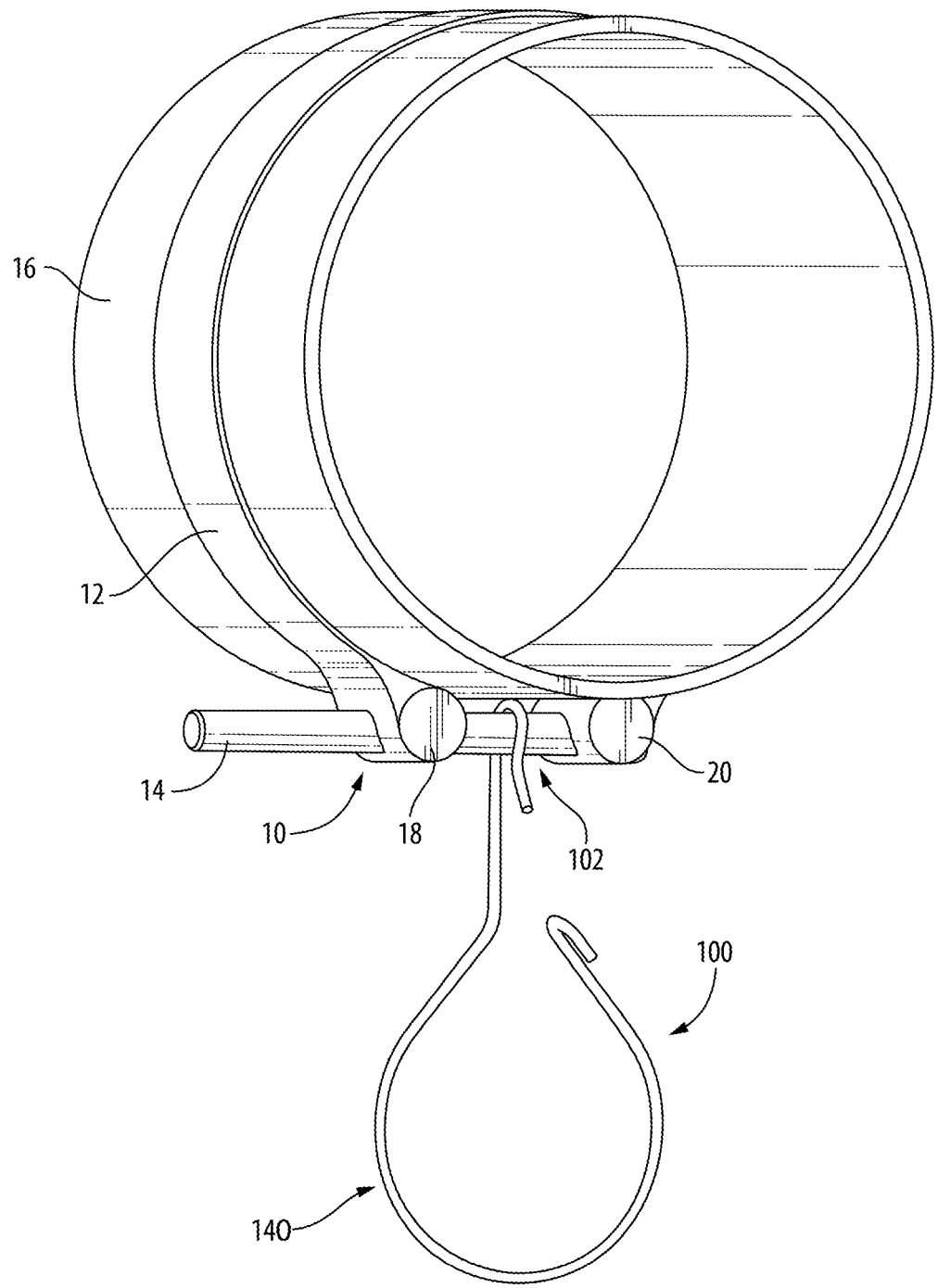
FIG. 3 is a view of the electrical cable hanger according to the illustrative embodiment of the present disclosure depicted in FIGS. 1 and 2 for describing an example of how the hanger is attached to a structure.

A wire or cable hanger according to an illustrative embodiment of the present disclosure is shown in FIGS. 1-3 and is referred to herein generally as hanger 100. Solar panels, arrays, trackers, etc. may utilize pipes, rails or tubes as frames or support structures. Various portions of the frames or support structures may have different shapes, dimensions and configurations and may be joined together utilizing various types of hardware having different shapes, dimensions and configuration. For example, as depicted in FIG. 3, two or more portions of tubing or piping forming a portion of a rail support structure 16 may be joined together and secured utilizing a clamp 10 as shown. These types of clamps may also be used for attaching and holding brackets (not shown) used on the support structures. Clamps 10 may include a band 12 which wraps around rail support structure 16 and includes a cross bolt or screw member 14 extending between attachment points 18, 20. Screw member 14 can be rotated to tighten or loosen band 12 on support structure 16. Cable hanger 100 according to an illustrative embodiment of the present disclosure is particularly well suited for use as cable management on such frames or supports. For example, a proximal end 102 may be attached to and hung from screw member 14 such that cable holding section 140 hangs below clamp 10 for supporting wires or cables passing thereby.

The electrical cable hanger 100 according to an illustrative embodiment of the present disclosure will be described in more detail by reference to FIGS. 1 and 2 and may be referred to herein generally as hanger 100. Hanger 100 is formed from wire 114 and includes a hook end section 102 and a cable holding section 140. Hook end section or proximal end section 102 includes a substantially circular bend 124 forming a hook clip opening 144. Hook clip opening 144 has a diameter "D" and is dimensioned to receive and be clipped to a cross bolt or screw member 14 an example of which is depicted in FIG. 3. Depending on the particular design and configuration of the clamp 10, hook end section 102 of hanger 100 may be configured differently. For example, hook end section 102 may, as will be described in later illustrative embodiments, assume a shape and configuration other than circular bend 124 and may be, for example, substantially square, rectangular, triangular, oblong, etc. or combinations thereof and may, for example, correspond to the shape of the cross bolt or screw member 14. The width "X" of the opening 142 to hook clip opening 144 (e.g., between bend 122 of circular bend 124 and arm section 126) may be less than diameter "D" thus ensuring a secure attachment when cross bolt or screw member 14 is received in hook clip opening 144. Of course, depending on a particular application, the width "X" may be the same or greater than diameter "D". According to the illustrative embodiment, the portion of the wire 114 immediately prior to the terminal end 120 flares outwardly as shown in FIG. 1 such that terminal end 120 may be more easily pried outwardly to enlarge opening 142 making it easier for hook end section 102 to receive cross bolt or screw member 14. Of course, this flared terminal end portion may be omitted in any of the disclosed embodiments. Intermediate arm section 126 extends to bend 128 substantially straight arm segment 123 and then loop section 112 forming cable holding loop 132 of cable holding section 140. Loop section 112 continues to substantially straight arm segment 121 and U-shaped bend 134, ending in distal end 136 of wire 114. U-shaped bend 134 provides a smooth rounded surface at opening 130 so that when cables are pressed through opening 130 and received in loop section 112, the cables are not nicked or otherwise damaged. According to an illustrative embodiment of the present disclosure, the width "W" of opening 130 to cable holding loop 132 may be slightly smaller than a diameter of cabling to be held by cable holding loop 132. The diameter "D" may be selected to correspond to an anticipated number/dimensions of cabling to be held and may be, for example, in the 1"-8" range or larger. Although cable holding loop 132 is depicted as generally circular in shape, it will be appreciated other shapes including, for example, square, rectangular, oval, triangular, etc. may be utilized.

As shown in FIG. 2, assuming the portions of the hanger 100 forming hook end section 102 are substantially in the same plane as the paper (e.g., the X-Y plane), cable holding section 140 extends substantially perpendicularly out of the paper in the Z-direction. Depending on a particular application, U-shaped bend 134 may be in the same plane as hook end section 102 or in the same plane as the cable holding section 140. Of course, this particular orientation may be reconfigured depending on a desired configuration of cable holding section. That is, cable holding section 140 may be formed in the same plane as the rest of hanger 100 or in any other orientation suitable for a particular application. This may be accomplished during manufacture of hanger 100 or by the end user by manually manipulating the hanger 100 into the desired orientation. As will be appreciated from FIG. 3, hook end section 102 can be hung from any portion of any type of support structure having a structure similar to cross bolt or screw member 14.

Figure 4:
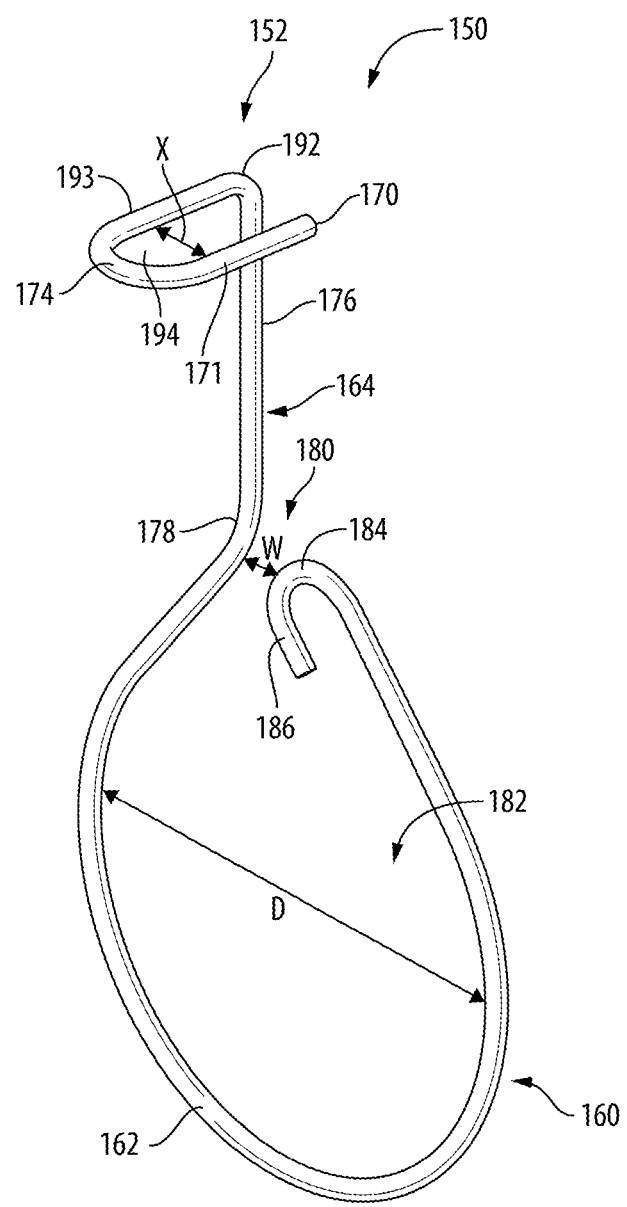
FIG. 4 is a perspective view of an electrical cable hanger according to another illustrative embodiment of the present disclosure.
Figure 5:
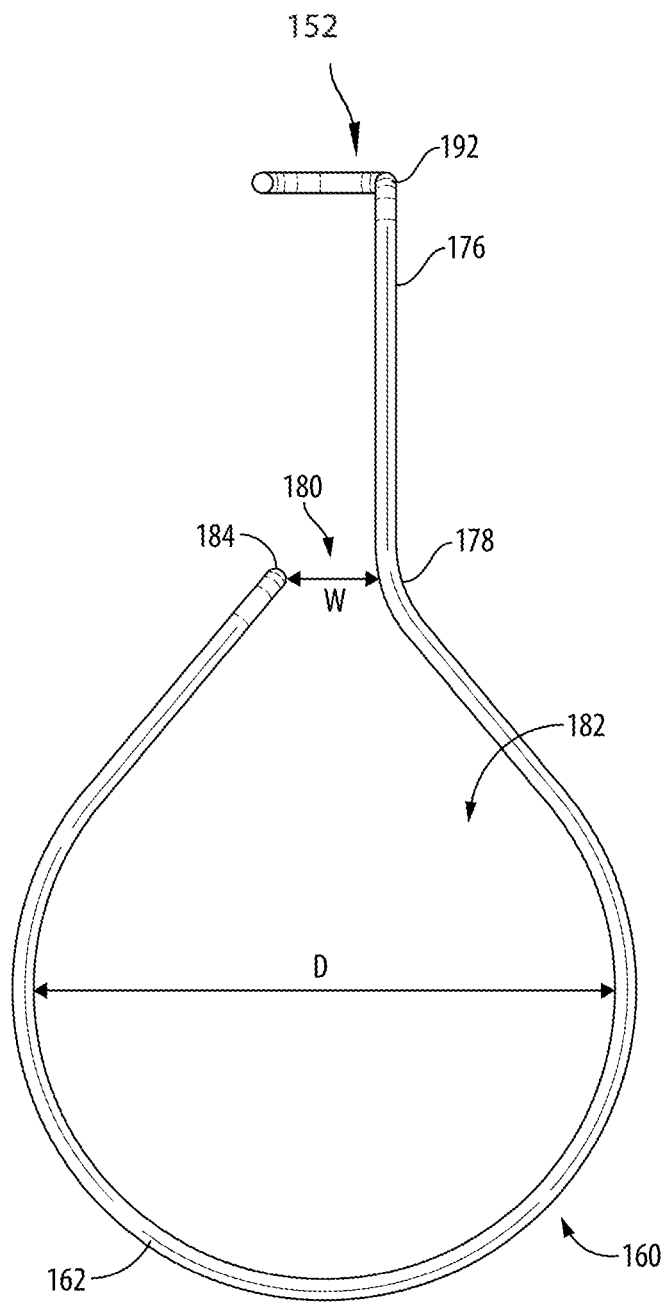
FIG. 5 is a front view of electrical cable hanger according to the illustrative embodiment of the present disclosure depicted in FIG. 4.
Figure 6:
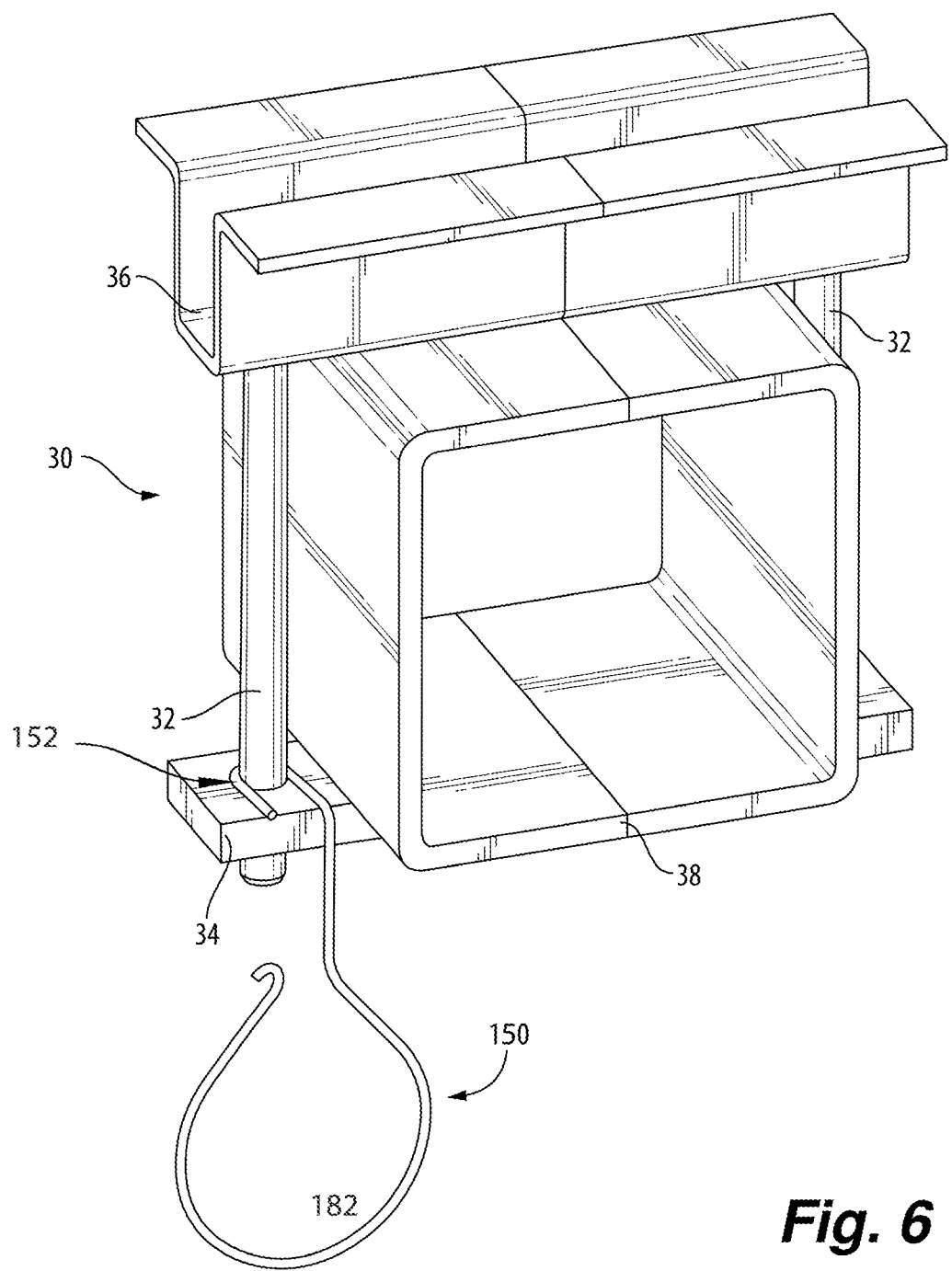
FIG. 6 is a perspective view of the electrical cable hanger according to the illustrative embodiment of the present disclosure depicted in FIGS. 4 and 5 for describing an example of how the electrical cable hanger is attached to a structure.

A wire or cable hanger according to another illustrative embodiment of the present disclosure is shown in FIGS. 4-6 and is referred to herein generally as hanger 150. A portion of yet another type of support structure to which wire or cable hangers can be attached is depicted in FIG. 6. This type of support structure may include tubing or piping 38. The piping or tubing may be supported and held by another structure 36 utilizing bolts 32 and cross member 34. This type of support structure 30 also makes a convenient location for hanging electrical cable hangers used to support cabling running in the vicinity of the support structure 30. A cable hanger 150 according to an illustrative embodiment of the present disclosure is particularly well suited for use as cable management on such a support structure. For example, a proximal end or hook end section 152 of hanger 150 may be attached to or hung from vertical bolt 32 and supported by cross member 34 such that distal end or cable holding loop 182 is positioned below support structure 30 for supporting wires or cables passing support structure 30.

The electrical cable hanger 150 according to this illustrative embodiment of the present disclosure will be described in more detail by reference to FIGS. 4 and 5 and may be referred to herein generally as hanger 150. Hanger 150 is formed from a single section of wire 164 and includes a proximal or hook end section 152 and a cable holding section 160. Hook end section 152 includes a substantially circular bend 174 forming a hook clip opening 194. Hook clip opening 194 has a diameter "X" and is dimensioned to receive and be clipped to a bolt such as, for example, the vertical bolt 32 depicted in FIG. 6. Depending on the particular design and configuration of the support structure 30, hook end section 152 of hanger 150 may be configured differently. For example, hook end section 152 may assume a shape other than circular bend 194 and may be, for example, substantially square, rectangular, triangular, oblong, etc. to correspond to the shape of the attachment point which in this particular illustration is bolt 32. Arm section 193 which forms part of hook end section 152 extends from circular bend 174 to right angle bend 192 and to arm section 176. Arm section 176 then extends to bend 178 and then loop section 162 forming cable holding loop 182 of cable holding section 160. Loop section 162 continues to U-shaped bend 184, ending in distal end 186 of wire 164. U-shaped bend 184 provides a smooth rounded surface at opening 180 so that when cables are pressed through opening 180 and received in loop section 162, the cables are not nicked or otherwise damaged. According to an illustrative embodiment of the present disclosure, the width "W" of opening 180 to cable holding loop 182 may be slightly smaller than a diameter of cabling to be held by cable holding loop 182. The diameter "D" of loop section 162 may be selected to correspond to an anticipated number/dimensions of cabling to be held and may be, for example, in the 1"-8" range or larger. Although cable holding loop 182 is depicted as generally circular in shape, it will be appreciated other shapes including, for example, square, rectangular, oval, triangular, etc. may be utilized.

As shown in FIG. 5, assuming the portions of the hanger 150 forming cable holding section 160 are substantially in the same plane as the paper (e.g., the X-Y plane), hook end section 152 extends substantially perpendicularly out of the paper in the negative Z-direction. Depending on a particular application, U-shaped bend 184 may be in the same plane as hook end section 152 or in the same plane as the cable holding section 160. Of course, this particular orientation may be reconfigured depending on a desired configuration of cable holding section 160. That is, cable holding loop 182 may be formed in any plane or in any other orientation suitable for a particular application. This may be accomplished during manufacture of hanger 150 or by the end user by manually manipulating the hanger 150 into the desired orientation. As will be appreciated from FIG. 6, hook end section 152 may be suitable to be hung from any portion of any type of support structure having a structure similar to bolt 32 and cross member 34.

Figure 7:
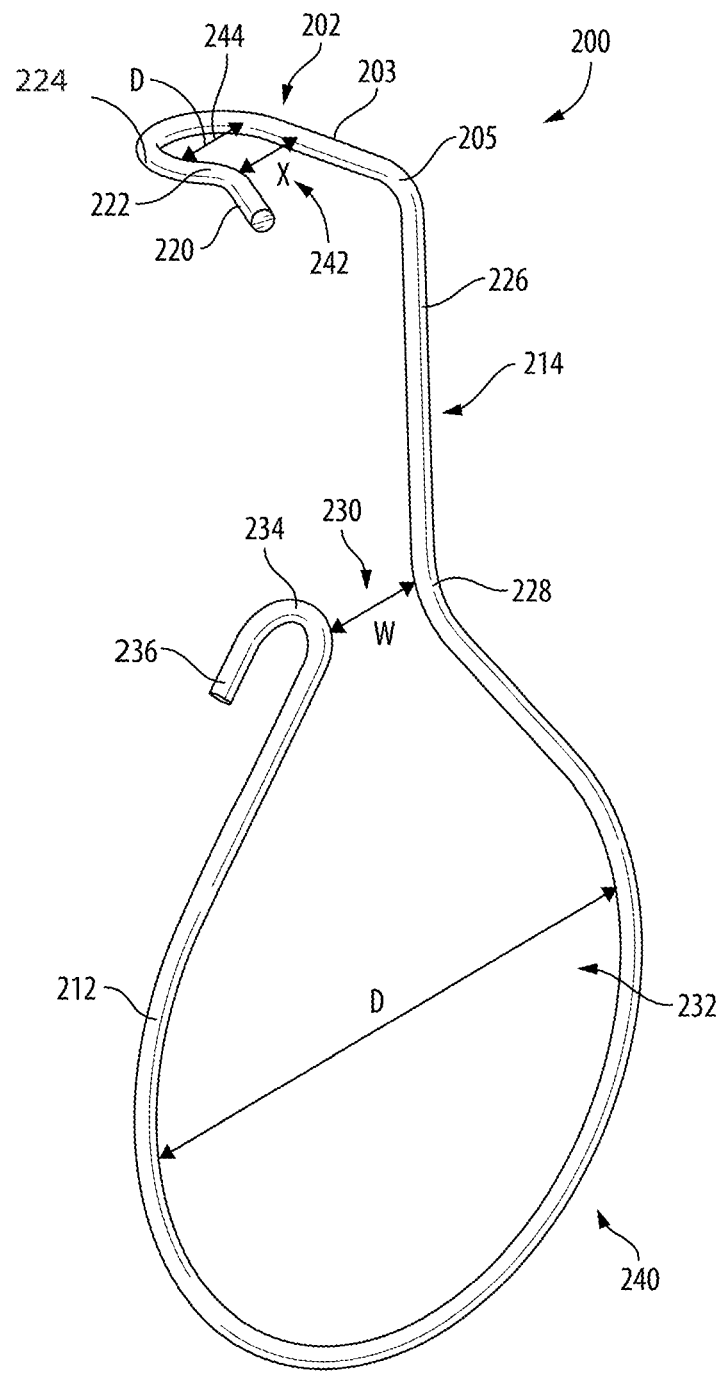
FIG. 7 is a perspective view of an electrical cable hanger according to another illustrative embodiment of the present disclosure.
Figure 8:
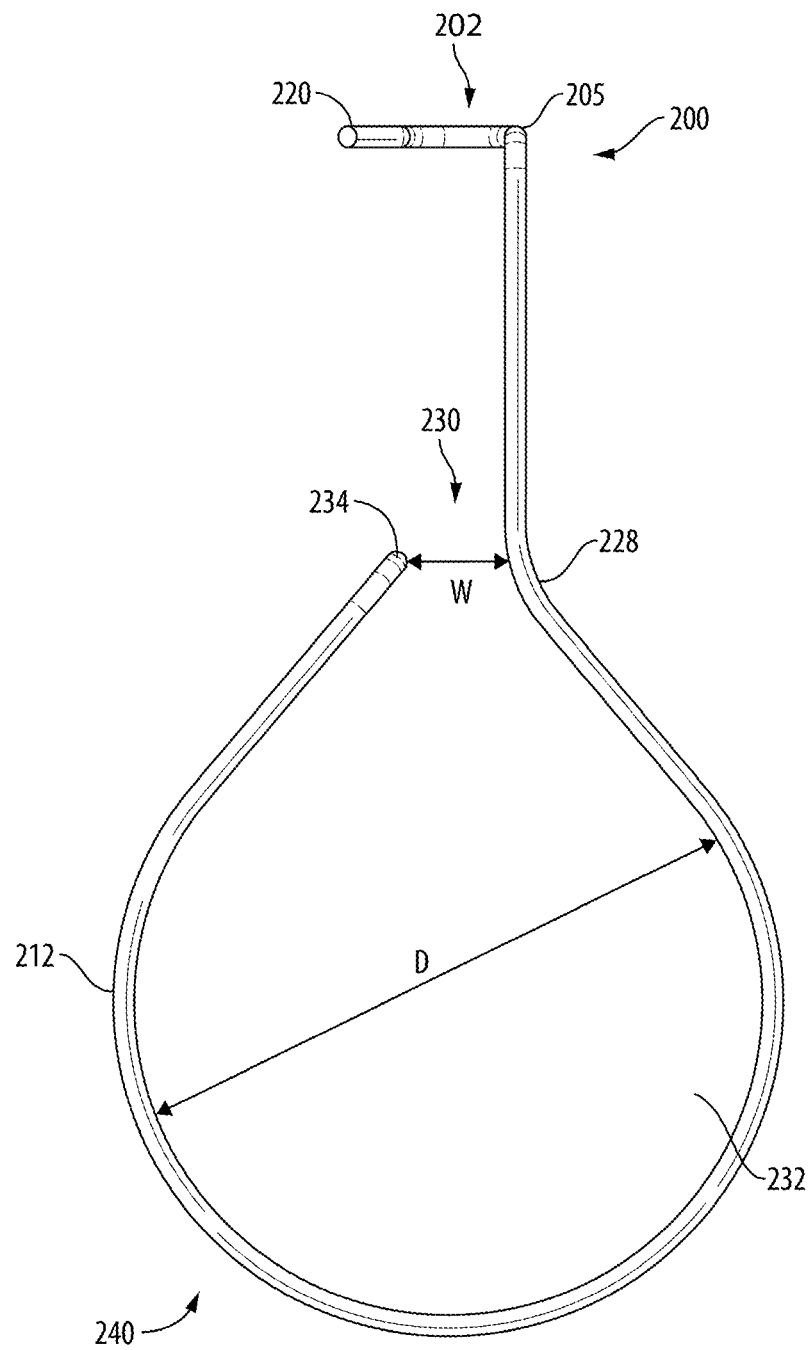
FIG. 8 is a front view of the electrical cable hanger according to the illustrative embodiment of the present disclosure depicted in FIG. 7.
Figure 9:
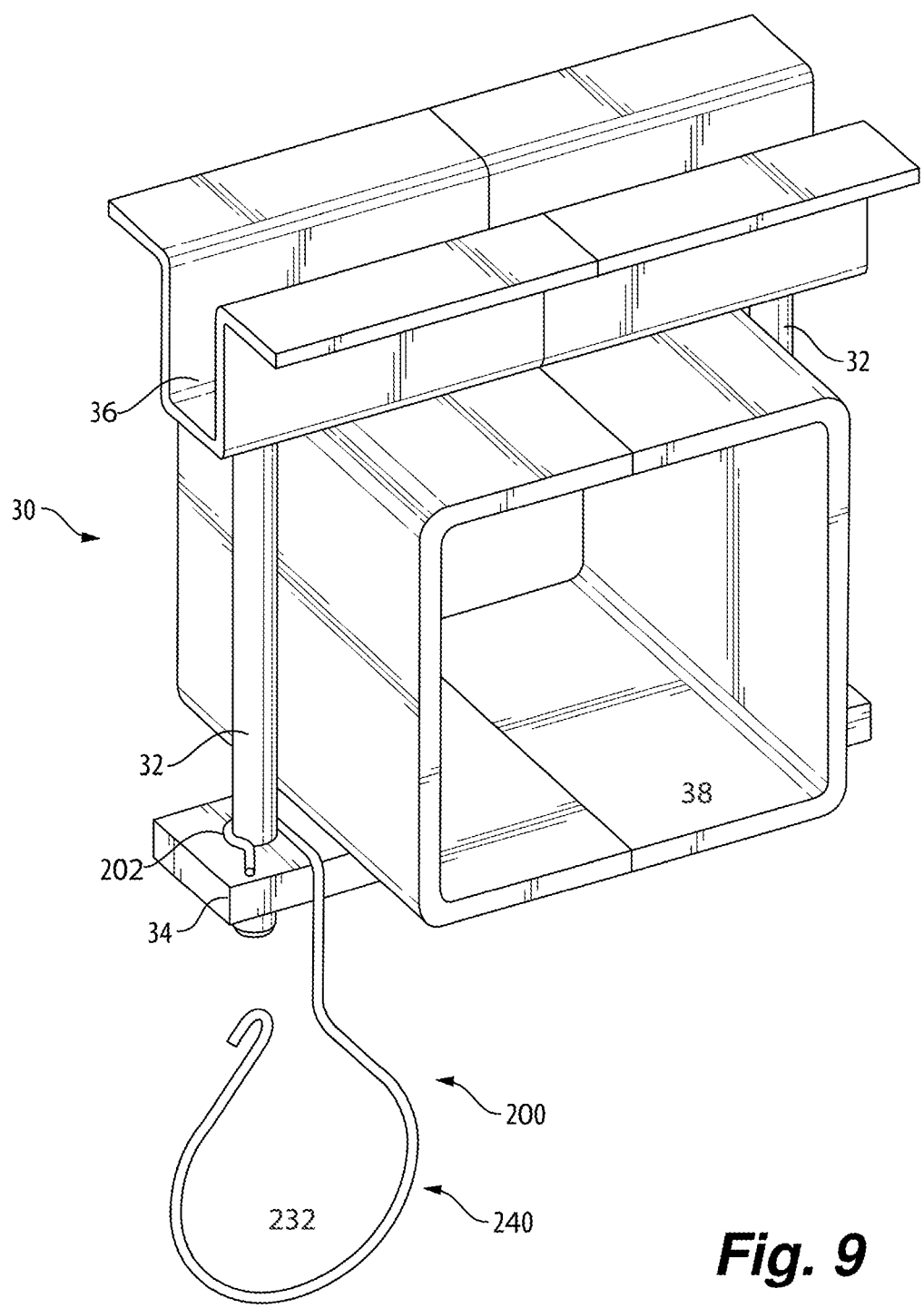
FIG. 9 is a perspective view of the electrical cable hanger according to the illustrative embodiment of the present disclosure depicted in FIGS. 7 and 8 for describing an example of how the hanger is attached to a structure.
Figure 10:
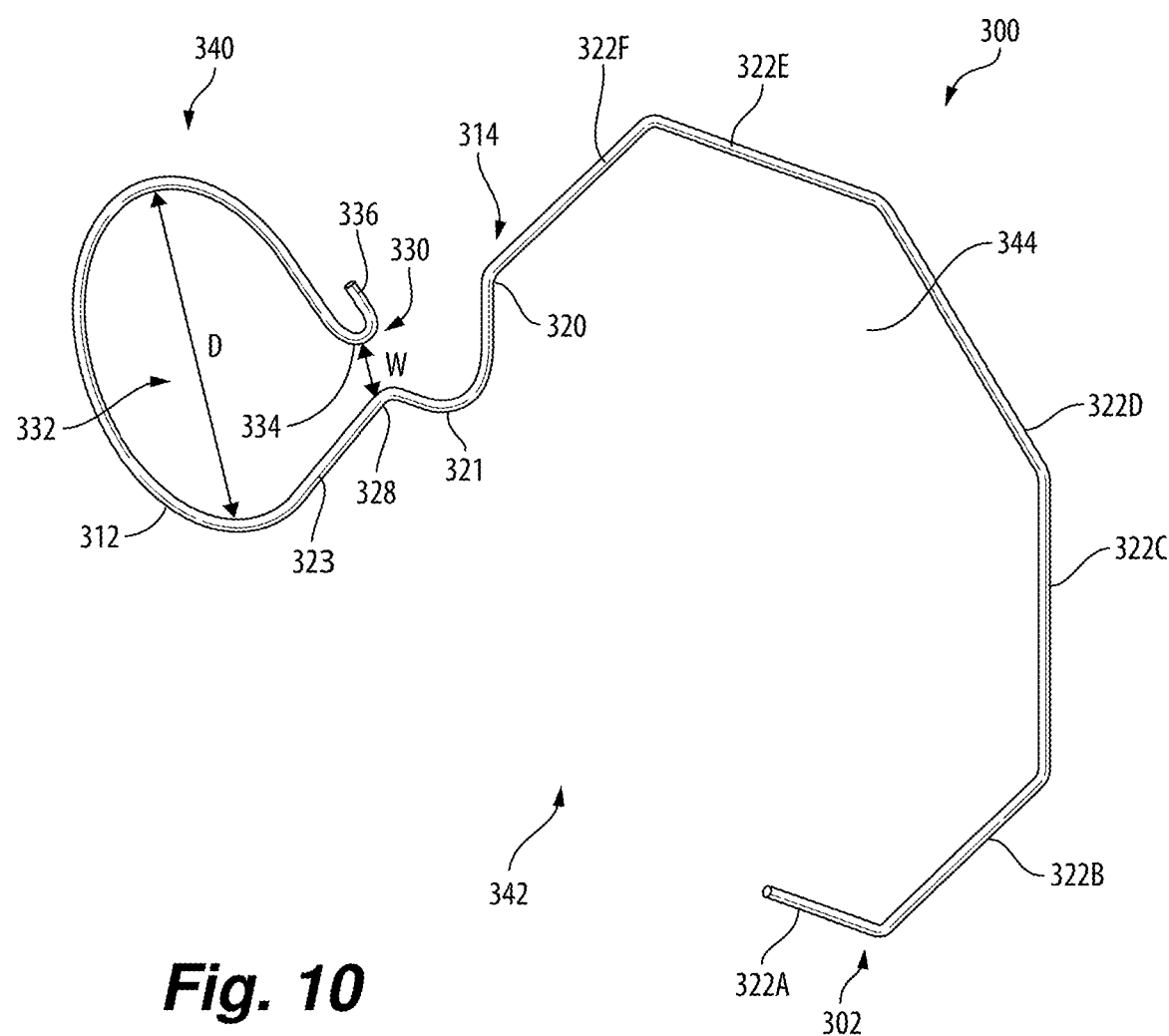
FIG. 10 is a perspective view of an electrical cable hanger according to another illustrative embodiment of the present disclosure.

A wire or cable hanger according to another illustrative embodiment of the present disclosure is shown in FIGS. 7-9 and is referred to herein generally as hanger 200. Hanger 200 is also particularly well suited to manage cabling on the type of support structure as depicted in FIG. 9. This type of support structure may include tubing or piping 38. The piping or tubing may be supported and held by another structure 36 utilizing bolts 32 and cross member 34. This type of support structure 30 also makes a convenient location for hanging electrical cable hangers used to support cabling running in the vicinity of the support structure 30. A cable hanger 200 according to an illustrative embodiment of the present disclosure is particularly well suited for use as cable management on such a support structure. For example, a proximal end or hook end section 202 of hanger 200 may be attached to or hung from vertical bolt 32 and supported by cross member 34 such that distal end or cable holding loop 232 is positioned below support structure 30 for supporting wires or cables passing support structure 30.

The electrical cable hanger according to this illustrative embodiment of the present disclosure will be described in more detail by reference to FIGS. 7 and 8 and may be referred to herein generally as hanger 200. Hanger 200 is formed from a single section of wire 214 and includes a proximal or hook end section 202 and a cable holding section 240. Hook end section 202 includes a substantially circular bend 224 forming a hook clip opening 244. Hook clip opening 244 has a diameter "D" and is dimensioned to receive and be clipped to a bolt such as, for example, the vertical bolt 32 depicted in FIG. 9. The width "X" of the opening 242 to hook clip opening 244 (e.g., between bend 222 of circular bend 224 and arm section 203) may be less than diameter "D" thus ensuring a secure attachment when cross bolt 34 is received in hook clip opening 244. Of course, depending on a particular application, the width "X" may be the same or greater than diameter "D". Depending on the particular design and configuration of the support structure 30, hook end section 202 of hanger 200 may be configured differently. For example, hook end section 202 may assume a shape other than circular bend 224 and may be, for example, substantially square, rectangular, triangular, oblong, etc. to correspond to the shape of the bolt 32. The portion of the wire 214 immediately prior to the terminal end 220 flares outwardly as shown in FIG. 7 such that terminal end 220 may be easily pried outwardly to enlarge opening 242 making it easier for hook end section 202 to receive cross bolt 32. Arm section 203 which forms part of hook end section 202 extends from circular bend 224 to right angle bend 205 and to arm section 226. Arm section 226 then extends to bend 228 and then loop section 212 forming cable holding loop 232 of cable holding section 240. Loop section 212 continues to U-shaped bend 234, ending in distal end 236 of wire 214. U-shaped bend 234 provides a smooth rounded surface at opening 230 so that when cables are pressed through opening 230 and received in loop section 212, the cables are not nicked or otherwise damaged. According to an illustrative embodiment of the present disclosure, the width "W" of opening 230 to cable holding loop 232 may be slightly smaller than a diameter of cabling to be held by cable holding loop 232. The diameter "D" may be selected to correspond to an anticipated number/dimensions of cabling to be held and may be, for example, in the 1"-8" range or larger. Although cable holding loop 232 is depicted as generally circular in shape, it will be appreciated other shapes including, for example, square, rectangular, oval, triangular, etc. may be utilized.

As shown in FIG. 8, assuming the portions of the hanger 200 forming cable holding section 240 are substantially in the same plane as the paper (e.g., the X-Y plane), hook end section 202 extends substantially perpendicularly out of the paper in the negative Z-direction. Depending on a particular application, U-shaped bend 234 may be in the same plane as hook end section 202 or in the same plane as the cable holding section 240. Of course, the particular orientation may be reconfigured depending on a desired configuration of cable holding section. That is, hook end section 202 may be formed in the X-Y plane as the rest of hanger 200 or in any other orientation suitable for a particular application. This may be accomplished during manufacture of hanger 200 or by the end user by manually manipulating the hanger 200 into the desired orientation. As will be appreciated from FIG. 9, hook end section 202 can be hung from any portion of any type of support structure having a structure similar to bolt 32 and cross member 34.

Figure 11:
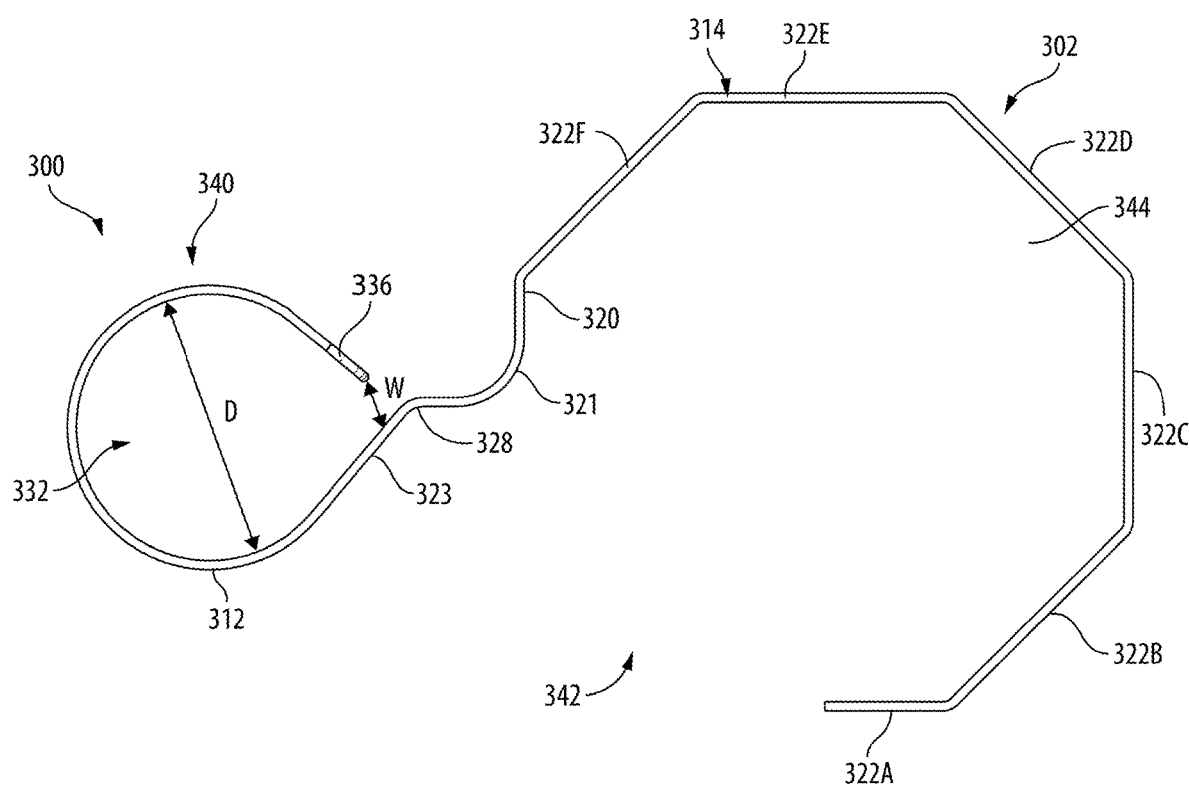
FIG. 11 is a front view of the electrical cable hanger according to the illustrative embodiment of the present disclosure depicted in FIG. 10.
Figure 12A:
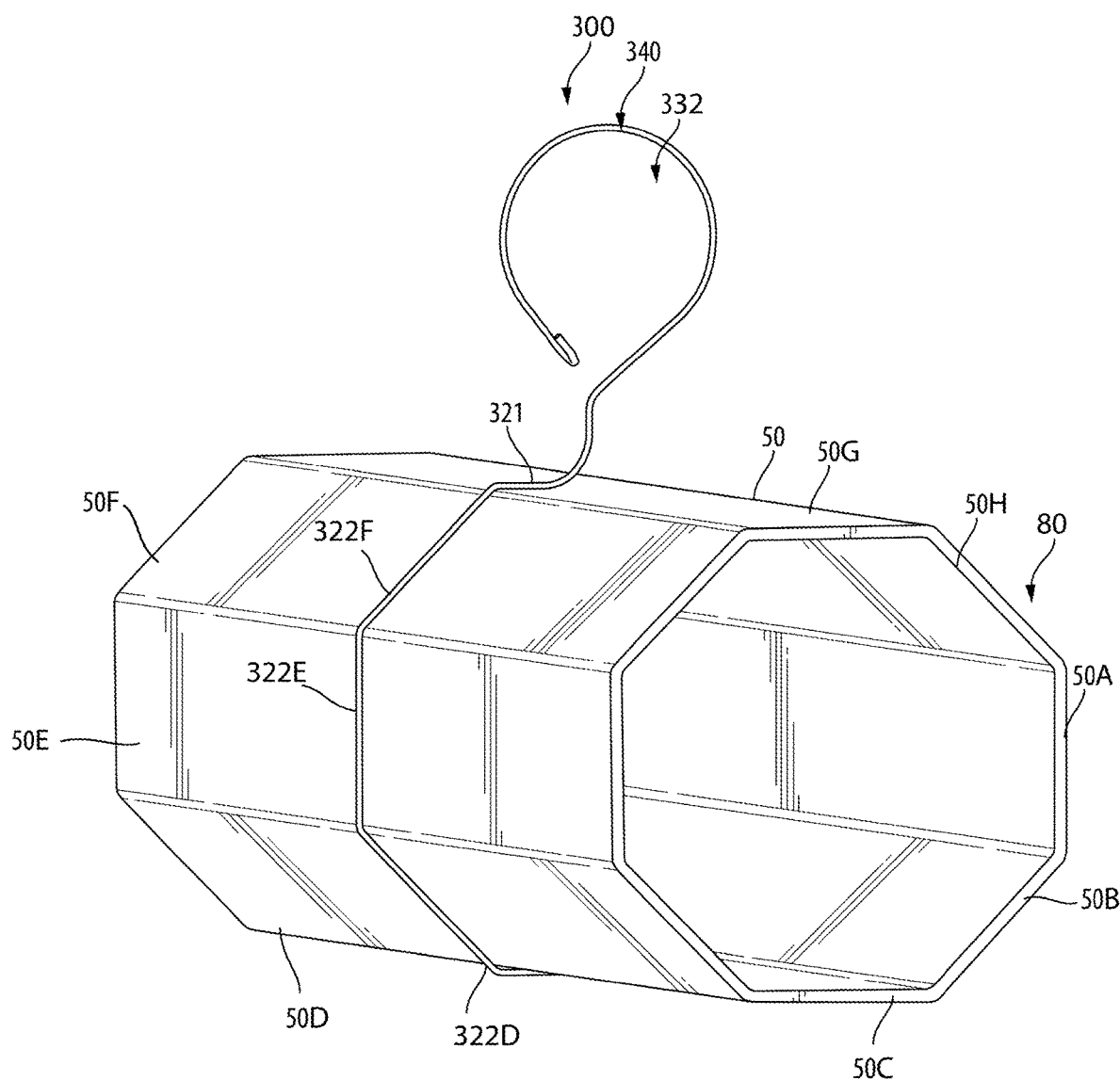
FIGS. 12A and 12B are perspective views of the electrical cable hanger according to the illustrative embodiment of the present disclosure depicted in FIGS. 10 and 11 for describing an example of how the hanger is attached to a structure.
Figure 12B:
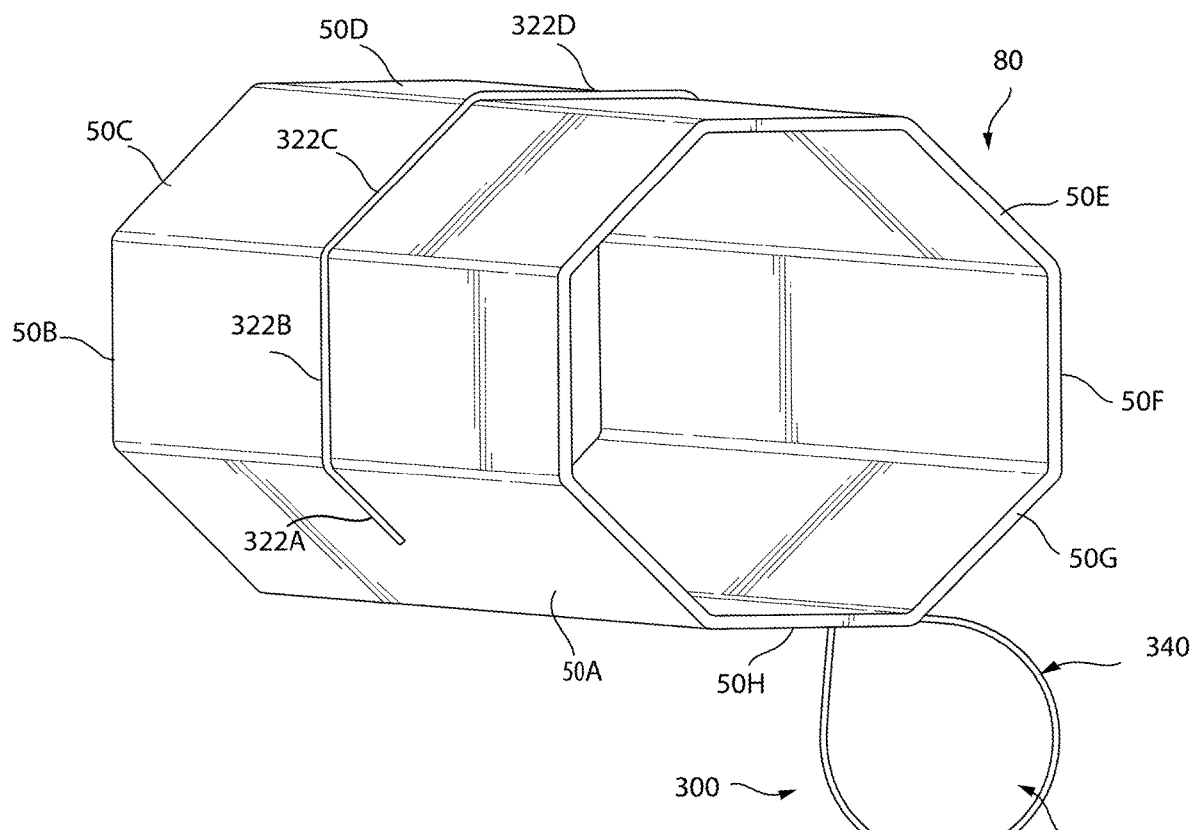

A wire or cable hanger according to another illustrative embodiment of the present disclosure is shown in FIGS. 10-12B and is referred to herein generally as hanger 300. Hanger 200 is particularly well suited to manage cabling on a type of support structure 80 as depicted in FIGS. 12A, 12B. This type of support structure 80 may include the use of tubing or piping 50 forming a portion of a support structure 80. As depicted in these figures, the tubing 50 is hexagonal in cross-section having eight sides. It will be appreciated the cross-sectional shape of the tubing might take other forms including round or may have any number of sides (e.g., 2 sides, 3 sides, 4 sides, 5 sides, 6 sides, 7 sides, etc.). The support structure 80 and, in particular, the tubing 50, also makes a convenient location for hanging electrical cable hangers used to support cabling running in the vicinity of the support structure. A cable hanger 300 according to an illustrative embodiment of the present disclosure is particularly well suited for use as cable management on such a support structure. For example, a proximal end or hook end section 302 of hanger 300 may be attached to or hung from and supported by tube 50 such that the distal end or cable holding loop 332 is positioned next to support structure 80 for supporting wires or cables passing support structure 80.

The electrical cable hanger 300 according to this exemplary embodiment of the present disclosure will be described in more detail by reference to FIGS. 10-12B and may be referred to herein generally as hanger 300. Hanger 300 is formed from a single segment of wire 314. The wire may have a substantially circular cross section, although other cross-sectional shapes including square, rectangular, octagonal, etc. are also contemplated. Hanger 300 includes a proximal end 302 which may be referred to herein as proximal end section or hook end section 302. Proximal end section 302 includes a hook clip opening 342 shaped and dimensioned to receive, for example, bracket or support 50 which is retained in clip area 344. Hanger 300 also includes a distal end 340 which may be referred to herein as distal end section or cable loop end section 340. The cable loop end section 340 includes loop section 312 of wire 314 and holds and secures the cabling and wiring.

A proximal end of wire 314 includes a number of "sides" or substantially straight portions. The number of straight portions depends on a number of sides forming the bracket or tubing to which hanger 300 is to be attached. Generally, the hanger 300 may include a number of sides to correspond to at least half of the sides forming the outer circumference of the portion of the support structure 80 to which the hanger 300 will be attached. For example, according to the present illustrative embodiment, wire 314 includes six sides (322A-322F) which correspond to six of the eight sides (e.g., sides 50A-50F) forming tubing 50. The lengths of sides 322B-322F are generally dimensioned to correspond to the dimensions of the sides 50B-50F of tubing 50. The very proximal end of wire 314 which forms side 322A may be shorter or longer than the corresponding side of the tubing 40. Of course, it will be appreciated one or more of sides 322A-322F may be configured in different lengths and/or shapes, depending on the lengths and/or shapes of the sides of the bracket to which it will be attached. As noted above, to ensure a secure reliable connection to the tubing 50, hanger 300 should preferably extend around at least half of the circumference of the bracket to which it is being attached. According to the present illustrative embodiment, hanger 300 extends around more than half of the circumference of tubing 50 providing a secure and reliable connection to the support structure 80. Side 322F extends to bend 320 and then bend 328 with arced portion 321 being formed therebetween. Arced portion 321 makes contact with yet another side (e.g., side 50G) of tubing 50 as depicted in FIG. 12A providing even further positive more secure contact with tubing 50. Extension arm 323 extends from bend 328 and may be any desired length suitable for a particular application. For example, depending on the length of arm 323, cable loop end section 340 can be set close to support structure 80 or may extend further away from support structure 80.

Extension arm 323 extends to loop section 312 forming cable holding loop 332 at cable loop end portion 340. Loop section 312 continues to U-shaped bend 334, ending in distal end 336 of wire 314. U-shaped bend 334 provides a smooth rounded surface at opening 330 so that when cables are pressed through opening 330 and received in loop section 312, the cables are not nicked or otherwise damaged. According to an illustrative embodiment of the present disclosure, the width "W" of opening 330 to cable holding loop 332 may be slightly smaller than a diameter of cabling to be held by cable holding loop 332. The diameter "D" of cable holding loop 332 may be selected to correspond to an anticipated number/dimensions of cabling to be held and may be, for example, in the 1"-8" range or larger. Although cable holding loop 332 is depicted as generally circular in shape, it will be appreciated other shapes including, for example, square, rectangular, oval, triangular, etc. may be utilized.

As shown in FIG. 11, the portions of the hanger 300 forming proximal end section 302 and distal end section 340 are substantially in the same plane as the paper (e.g., the X-Y plane), with U-shaped bend 336 extending substantially perpendicularly out of the paper in the Z-direction. Of course, this particular orientation may be reconfigured depending on a desired configuration of loop section 312. For example, proximal end section 302 and distal end section 340 may be formed in different planes or in any other orientation suitable for a particular application. This may be accomplished during manufacture of hanger 300 or by the end user by manually manipulating the hanger 300 into the desired orientation.

A coating may be provided on at least the portions of any of the above described hangers that come in contact with wires or cables. For example, as illustrated in FIG. 1A, portions of the hanger 100 that come into contact with wires and cables inserted into the loop opening may be coated with coating 101. Depending on a particular application, coating 101 may be an electrical insulator and/or may provide a higher coefficient of friction than the material forming the hanger itself. This allows the electrical wires and cables being held in loop opening to be electrically isolated from the hanger 100 and any structure upon which the hanger 100 is mounted. Providing a material with a higher coefficient of friction provides a surer grip to hold the wires and cables in position. Examples of suitable coatings may include rubber or rubber like materials, plastics, varnish, etc. Coating 101 may be applied to hanger 100 in any suitable manner including, for example, by brush, spray or dipping, etc. Of course, any of the embodiments described herein may have the coating 101 applied to all of the hanger or only the portion of the hanger that will contact cables or wires being held by the hanger.

The hook end sections (102, 152, 202) illustrated in the above-described embodiments, are substantially circular in shape and may or may not include a flared terminal end portion (e.g., portion 120). In addition, as mentioned above, the hook end sections (102, 152, 202) described with respect to above embodiments may have different shapes and configurations suitable for particular applications. According to other illustrative embodiments, the hook end sections may be generally polygonal in shape having any suitable number of sides and may include one or more nonlinear or curved sides. For example, as shown in FIGS. 13A-13C, the hook end sections may be substantially square (FIG. 13A), rectangular (FIG. 13B), triangular (FIG. 13C), oblong (FIG. 13D), etc.

Figure 13A:
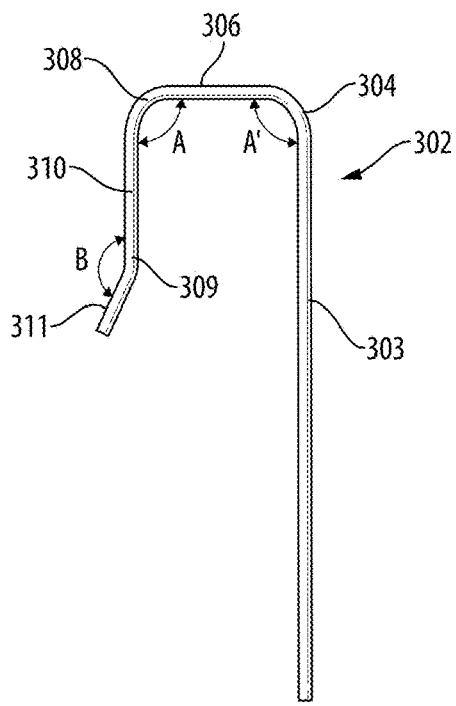
FIGS. 13A-13D are front views of hook end sections of electrical cable hangers according to various illustrative embodiments of the present disclosure.

Referring to FIG. 13A, hook end section 302 extends from intermediate arm section 303. Intermediate arm section 303 corresponds to the above-described intermediate arm sections 126, 176, 226 illustrated and described in the above embodiments between the hook end sections 102, 152, 202 and the cable holding loop section 132, 182, 232, respectively. Intermediate arm section 303 extends to elbow 304, arm 306, elbow 308, arm 310 and ends in flared terminal end portion 311. Of course, as described in above embodiments, flared terminal end portion 311 may be omitted. The lengths of arms 306, 310 and flared terminal end portion 311 may vary as suitable for a particular application. The length of arm 306 may be selected such that a distance between arm 310 and arm section 303 is the same or larger than a diameter or width of a member to which hook end section 302 is intended to be attached. In addition, the angles "A", "A'" formed by elbows 308, 304, respectively, may be the same or different as suitable for a particular application. Arms 306, 310 may be substantially the same length as shown. The angle "B" formed at elbow 309 between arm 310 and flared terminal end portion 311 may be anywhere between 0-360 degrees.

Figure 13B:
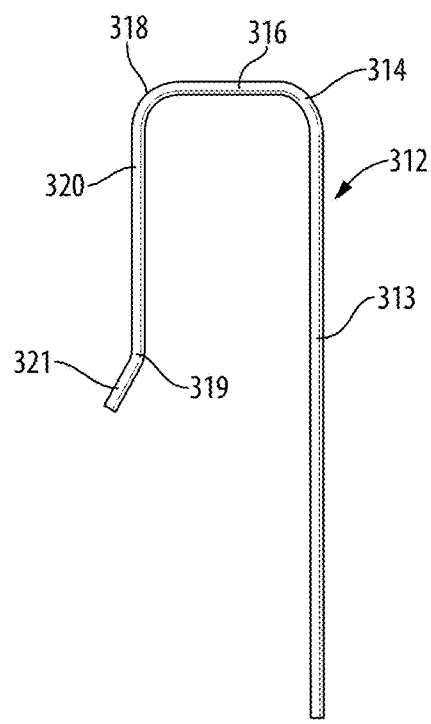

Referring to FIG. 13B, the hook end section 312 may be substantially rectangular. Hook end section 312 extends from intermediate arm section 313 to elbow 314, arm 316, elbow 318, arm 320 and ends in flared terminal end portion 321. According to this illustrative embodiment, arm 316 and arm 320 are different lengths as shown and each may vary depending on a particular application. According to the present illustrative embodiment, arm 320 is longer than arm 316 creating a vertical rectangular shape. Of course, arm 316 may be made longer than arm 320 creating a horizontal rectangular shape as desired. The length of arm 316 may be selected such that a distance between arm 320 and arm section 313 is the same or larger than a diameter or width of a member to which hook end section 312 is intended to be attached. The length of flared terminal end portion 321 may vary as suitable for a particular application. Of course, as described in above embodiments, flared terminal end portion 321 may be omitted. In addition, the angles formed by elbows 314, 318, respectively, may be the same or different as suitable for a particular application. The angle formed at elbow 319 between arm 320 and flared terminal end portion 321 may be anywhere between 0-360 degrees.

Figure 13C:
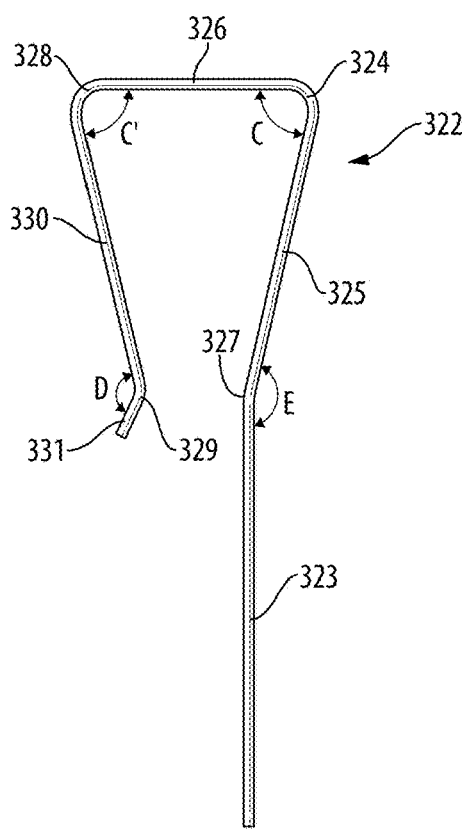

Referring to FIG. 13C, the hook end section may be substantially triangular. Depending on a particular application, the triangular shape may be equilateral, acute, obtuse, scalene, isosceles, right-triangle, etc. According to the present illustrative embodiment, hook end section 322 extends from intermediate arm section 323 to elbow 327, to arm 325, elbow 324, arm 326, elbow 328, arm 330, elbow 329 and ends in flared terminal end portion 331. Of course, as described in above embodiments, flared terminal end portion 331 may be omitted. According to the present illustrative embodiment, arms 325, 326 and 330 may be the same or similar lengths. Of course, the lengths of arms 325, 326 and 330 may vary from each other. The length of arms 325, 326 and 330 may be selected such that a distance between arm 330 and arm 325 at its narrowest or widest point is the same or larger than a diameter or width of a member to which hook end section 322 is intended to be attached. In addition, the angles "C", "C'" formed by elbows 324, 328, respectively, may be the same or different as suitable for a particular application. The angle "D" formed at elbow 329 between arm 330 and flared terminal end portion 331 may be anywhere between 0-360 degrees. The angle "E" formed at elbow 327 between intermediate arm 323 and arm 325 may generally be between 45-225 degrees and, preferably, between 90-180 degrees.

Figure 13D:
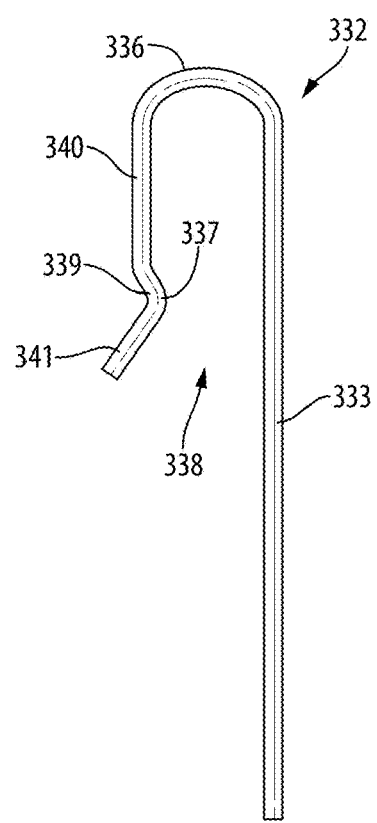

Referring to FIG. 13D, the hook end section 332 may include a nonlinear or curved side and may be, for example, substantially oblong. Hook end section 332 extends from intermediate arm section 333 to semi-circular U-shaped arm 336, to arm 340, elbow 339 and ends in flared terminal end portion 341. Of course, as described in above embodiments, flared terminal end portion 341 may be omitted. In addition, in any of the disclosed embodiments the elbow 339 just prior to the flared terminal end portion may include an inward projection 337 which extends into the gap 338 at the opening to hook end section 332. The diameter of the semi-circular arm 336 may be selected to correspond to the portion of a structure to which it is intended to be attached. For example, the diameter of the semi-circular arm 336 may be the same or larger than a diameter of a member to which hook end 332 is intended to be attached. The inward projection 337 helps to maintain the portion of the structure received in hook end section 332 from falling out of the hook end section 332.

The hook end sections described herein in addition to having different shapes, may also be arranged in different configurations with respect to the intermediate arm sections. Referring to FIG. 14A, a hook end section 402 is similar to hook end 302 depicted above with respect to FIG. 13A but is configured differently with respect to the intermediate arm section and the rest of the cable hanger. For example, according to the present illustrative embodiment, hook end section 402 extends from intermediate arm section 403 at elbow 405 to arm 407, elbow 404, arm 406, elbow 408, arm 410, elbow 409, arm 401, elbow 460 and ends in flared terminal end portion 411. Of course, as described in above embodiments, flared terminal end portion 411 may be omitted. The lengths of arms 406, 410 and 401 are substantially the same but may vary as suitable for a particular application. The length of arms 406, 410, 401 may be selected such that a distance between arm 401 and arm 406 and/or between arm 410 and arm 407 is the same or larger than a diameter or width of a member to which hook end section 402 is intended to be attached. In addition, the angles "A", "A'" and "A''" formed by elbows 408, 409 and 404, respectively, may be the same or different as suitable for a particular application. The angle "B" formed at elbow 460 between arm 401 and flared terminal end portion 411 may be anywhere between 0-360 degrees. The angle "F" formed at elbow 405 between arm 403 and arm 407 may generally be between 45-225 degrees and preferably between 90-180 degrees.

Referring to FIG. 14B, the hook end section 412 is similar to hook end section 312 described above with respect to FIG. 13B but is configured differently with respect to the intermediate arm section and the rest of the cable hanger. For example, according to this illustrative embodiment, hook end section 412 extends from intermediate arm section 413 to elbow 415, arm 417, elbow 414, arm 416, elbow 418, arm 420, elbow 419, arm 421, elbow 462 and ends in flared terminal end portion 461. According to this illustrative embodiment, arms 416 and arm 421 may be substantially the same length or may vary depending on a particular application. The length of arm 416 may be selected such that a distance between arm 420 and arm section 417 is the same or larger than a diameter or width of a member to which hook end section 412 is intended to be attached. The length of flared terminal end portion 461 may vary as suitable for a particular application. Of course, as described in above embodiments, flared terminal end portion 461 may be omitted. In addition, the angles "A", "A'", "A''" formed by elbows 418, 419, 414, respectively, may be the same or different as suitable for a particular application. The angle formed at elbow 462 between arm 421 and flared terminal end portion 461 may be anywhere between 0-360 degrees as described with respect to previous embodiments. The angle formed at elbow 415 between arm 413 and arm 417 may generally be between 45-225 degrees and preferably between 90-180 degrees as described with respect to previous embodiments.

Referring to FIG. 14C, the hook end section 422 is similar to hook end section 322 described above with respect to FIG. 13C but is configured differently with respect to the intermediate arm section and the rest of the cable hanger. Hook end section 422 may be substantially triangular. Depending on a particular application, the triangular shape may equilateral, acute, obtuse, scalene, isosceles, right-triangle, etc. According to the present illustrative embodiment, hook end section 422 extends from intermediate arm section 423 to elbow 427, arm 421, elbow 463, arm 425, elbow 424, arm 426, elbow 428, arm 430, elbow 429 and ends in flared terminal end portion 431. Of course, as described in above embodiments, flared terminal end portion 431 may be omitted. According to the present illustrative embodiment, arms 425, 426 and 430 may be the same or similar lengths. Of course, the lengths of arms 425, 426 and 430 may vary from each other as desired. The lengths of arms 425, 426 and 430 may be selected such that a distance between arm 430 and arm 425 at its narrowest or widest point is the same or larger than a diameter or width of a member to which hook end section 422 is intended to be attached. In addition, the angles "C", "C'" formed by elbows 428, 424, respectively, may be the same or different as suitable for a particular application. The angle "D" formed at elbow 429 between arm 430 and flared terminal end portion 431 may be anywhere between 0-360 degrees. The angle formed at elbow 427 between intermediate arm section 423 and arm 421 may generally be between 45-225 degrees and, more preferably, between 90-180 degrees. Angle "G" formed at elbow 463 between arm 421 and arm 425 may generally be between 45-270 degrees.

Referring to FIG. 14D, the hook end section 432 is similar to hook end section 332 described above with respect to FIG. 13C but is configured differently with respect to the intermediate arm section and the rest of the cable hanger. For example, according to the present illustrative embodiment, hook end section 432 extends from intermediate arm section 433 at elbow 434 to arm 435, semi-circular U-shaped elbow 436, to arm 440, elbow 438, arm 439, elbow 441 and ends in flared terminal end portion 440. Of course, as described in above embodiments, flared terminal end portion 440 may be omitted. The diameter of the semi-circular U-shaped elbow 436 may be selected to correspond to the portion of a structure to which it is intended to be attached. For example, the diameter of the semi-circular U-shaped elbow 436 may be the same or larger than a diameter of a member to which hook end 432 is intended to be attached. The angle "B" formed at elbow 441 between arm 439 and flared terminal end portion 440 may be anywhere between 0-360 degrees. The angle "H" formed at elbow 434 between arm 433 and arm 435 may generally be between 45-225 degrees and preferably between 90-180 degrees.

Referring to FIG. 14E, the hook end section 442 is similar to hook end section 102 described above with respect to FIG. 1 but is configured differently with respect to the intermediate arm section and the rest of the cable hanger. For example, according to the present illustrative embodiment, hook end section 442 extends from intermediate arm section 426 at elbow 443 to arm 445, semi-circular arm 444, elbow 442 and ends in flared terminal end portion 446. Of course, as described in above embodiments, flared terminal end portion 446 may be omitted. The diameter of the semi-circular arm 444 may be selected to correspond to the portion of a structure to which it is intended to be attached. For example, the diameter of the semi-circular arm 444 as well as the distance between elbow 442 and arm 445 may be the same or larger than a diameter of a member to which hook end 442 is intended to be attached. The angle "B" formed at elbow 442 between semi-circular arm 444 and flared terminal end portion 446 may be anywhere between 0-360 degrees. The angle "I" formed at elbow 443 between intermediate arm 426 and arm 445 may generally be between 45-225 degrees and preferably between 90-180 degrees.

Referring to FIG. 15A, hook end section 502 is substantially square and extends at an obtuse angle from arm section 503. For example, according to the present illustrative embodiment, hook end 502 extends from intermediate arm section 503 at elbow 505 to arm 506, elbow 508, arm 510, elbow 509, arm 501, elbow 560 and ends in flared terminal end portion 511. Of course, as described in above embodiments, flared terminal end portion 511 may be omitted. The lengths of arms 506, 510 and 501 are substantially the same but may vary as suitable for a particular application. The length of arms 506, 510, 501 may be selected such that a distance between arm 501 and arm 506 is the same or larger than a diameter or width of a member to which hook end section 502 is intended to be attached. In addition, the angles "K", "K'" formed by elbows 508, 509, respectively, are generally 90 degrees. However, these angles may be other than 90 degrees and may be the same or different from each other as suitable for a particular application. The angle "L" formed at elbow 505 between intermediate arm 503 and arm 506 is an obtuse angle between 90-180 degrees. Preferably, angle "L" and the length of arms 506, 510 are selected such that a hypothetical vertical axis "X" extending through arm 503 extends through elbow 509 and member 50 to which the hook end section 502 is to be attached. More preferably, angle "L" and the length of arms 506, 510 are selected such that the vertical axis "X" extends through the center of elbow 509 and the member 50 to which the hook end section 502 is to be attached.

Referring to FIG. 15B, hook end section 512 is substantially rectangular and extends at an obtuse angle from intermediate arm section 513. For example, according to the present illustrative embodiment, hook end section 512 extends from intermediate arm section 513 to elbow 515, arm 517, elbow 514, arm 516, elbow 518, arm 520, elbow 519, arm 521, elbow 562 and ends in flared terminal end portion 561. According to this illustrative embodiment, arms 516 and arm 521 may be substantially the same length or may vary depending on a particular application. The length of arm 516 may be selected such that a distance between arm 520 and arm section 517 is the same or larger than a diameter or width of a member to which hook end section 512 is intended to be attached. The length of flared terminal end portion 561 may vary as suitable for a particular application. Of course, as described in above embodiments, flared terminal end portion 561 may be omitted. In addition, the angles "A", "A'", "A''" formed by elbows 518, 519, 514, respectively, may be the same or different as suitable for a particular application. As in other described embodiments, the angle formed at elbow 562 between arm 521 and flared terminal end portion 561 may be anywhere between 0-360 degrees. In addition, similar to that described in the previous embodiment, the angle formed at elbow 515 between intermediate arm section 513 and arm 517 is an obtuse angle between 90-180 degrees. Preferably, this angle and the length of arms 516, 517 are selected such that a hypothetical vertical axis extending through intermediate arm section 513 extends through elbow 518 and the member to which the hook end section 512 is to be attached. More preferably, this angle and the length of arms 516, 517 are selected such that the vertical axis extends through the center of elbow 518 and the member to which the hook end section 512 is to be attached.

Referring to FIG. 15C, hook end section 512 is substantially triangular and extends at an obtuse angle from inter-mediate arm section 523. Depending on a particular application, the triangular shape may be equilateral, acute, obtuse, scalene, isosceles, right-triangle, etc. According to the present illustrative embodiment, hook end section 522 extends from intermediate arm section 523 to elbow 527, arm 525, elbow 524, arm 526, elbow 528, arm 530, elbow 529 and ends in flared terminal end portion 531. Of course, as described in above embodiments, flared terminal end portion 431 may be omitted. According to the present illustrative embodiment, arms 525, 526 and 530 may be the same or similar lengths. Of course, the lengths of arms 525, 526 and 530 may vary from each other as desired. The length of arms 525, 526 and 530 may be selected such that a distance between arm 530 and arm 525 at its narrowest or widest point is the same or larger than a diameter or width of a member to which hook end section 422 is intended to be attached. In addition, similar to that described above with respect to FIG. 14C, the angles formed by elbows 528, 524, respectively, may be the same or different as suitable for a particular application. The angle formed at elbow 529 between arm 530 and flared terminal end portion 531 may be anywhere between 0-360 degrees. In addition, similar to that described in the previous embodiments, the angle formed at elbow 527 between intermediate arm section 523 and arm 517 is an obtuse angle between 90-180 degrees. Preferably, this angle and the length of arms 525, 526 are selected such that a hypothetical vertical axis extending through intermediate arm section 523 extends through elbow 528 and the member to which the hook end section 522 is to be attached. More preferably, this angle and the length of arms 525, 526 are selected such that the vertical axis extends through the center of elbow 528 and the member to which the hook end section 522 is to be attached.

Referring to FIG. 15D, hook end section 532 is substantially rectangular and extends at an obtuse angle from intermediate arm section 533. For example, according to the present illustrative embodiment, hook end section 532 extends from intermediate arm section 533 at elbow 534 to arm 535, semi-circular U-shaped elbow 536, to arm 540, elbow 538, arm 539, elbow 541 and ends in flared terminal end portion 540. Of course, as described in above embodiments, flared terminal end portion 540 may be omitted. The diameter of the semi-circular U-shaped elbow 536 may be selected to correspond to the portion of a structure to which it is intended to be attached. For example, the diameter of the semi-circular U-shaped elbow 536 may be the same or larger than a diameter of a member to which hook end 532 is intended to be attached. As in earlier described embodiments, the angle formed at elbow 541 between arm 539 and flared terminal end portion 540 may be anywhere between 0-360 degrees. In addition, similar to that described in the previous embodiments, the angle formed at elbow 534 between intermediate arm section 533 and arm 535 is an obtuse angle between 90-180 degrees. Preferably, this angle and the length of arm 535 are selected such that a hypothetical vertical axis extending through intermediate arm section 533 extends through elbow portion 537 of the semi-circular U-shaped elbow 536 and the member to which the hook end section 532 is to be attached. More preferably, this angle and the length of arm 533 are selected such that the vertical axis extends through the center of elbow portion 537 and the member to which the hook end section 522 is to be attached.

Referring to FIG. 15E, hook end section 542 is substantially circular and extends at an obtuse angle from intermediate arm section 553. For example, according to the present illustrative embodiment, hook end section 542 extends from intermediate arm section 553 at elbow 543 to arm 545, semi-circular arm 544, elbow 542 and ends in flared terminal end portion 546. Of course, as described in above embodiments, flared terminal end portion 546 may be omitted. The diameter of the semi-circular arm 544 may be selected to correspond to the portion of a structure to which it is intended to be attached. For example, the diameter of the semi-circular arm 544 may be the same or larger than a diameter of a member to which hook end 542 is intended to be attached. As in earlier described embodiments, the angle formed at elbow 542 between semi-circular arm 544 and flared terminal end portion 546 may be anywhere between 0-360 degrees. In addition, similar to that described in the previous embodiments, the angle formed at elbow 543 between intermediate arm section 553 and arm 545 is an obtuse angle between 90-180 degrees. Preferably, this angle and the length of arm 545 are selected such that a hypothetical vertical axis extending through intermediate arm section 553 extends through semi-circular arm 544 and the member to which the hook end section 542 is to be attached. More preferably, this angle and the length of arm 545 are selected such that the vertical axis extends through the center of semi-circular arm 544 and the member to which the hook end section 532 is to be attached.

As noted above, the cable holding loops (132, 182, 232, 332) described with respect to above embodiments may have different shapes and configurations suitable for particular applications. According to embodiments of the present disclosure, the cable holding loops may be generally polygonal in shape having any suitable number of sides and may include one or more nonlinear curved sides. For example, as shown in FIGS. 16A-16D, the cable holding loops may be substantially square (FIG. 16A), rectangular (FIG. 16B), triangular (FIG. 16C), oblong (FIG. 16D), etc.

Figure 16A:
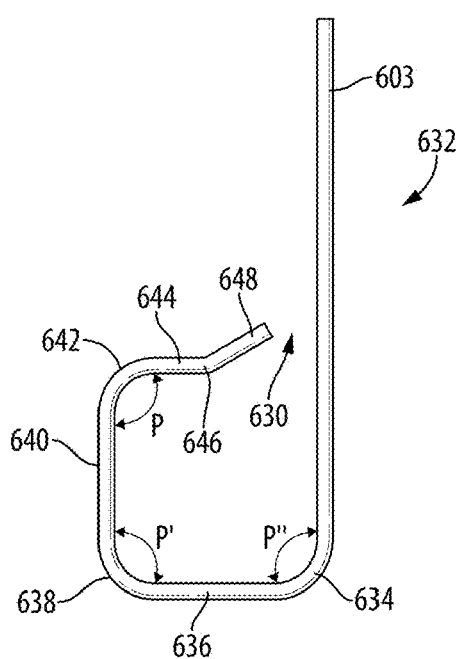
FIGS. 16A-16D are front view of cable holding sections of electrical cable hangers according to various illustrative embodiments of the present disclosure.
Figure 16B:
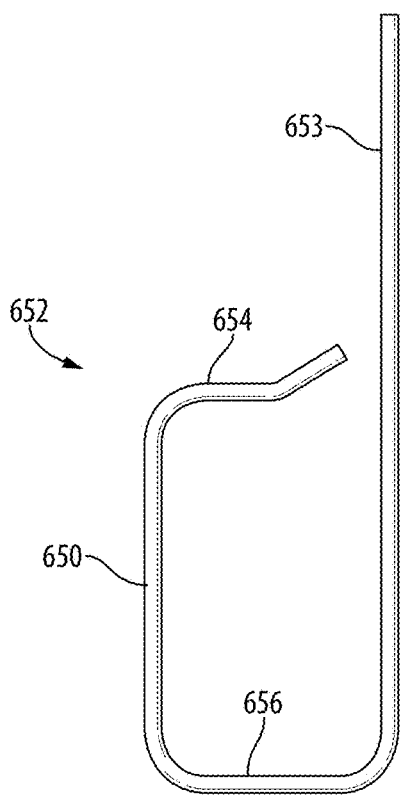
Figure 16C:
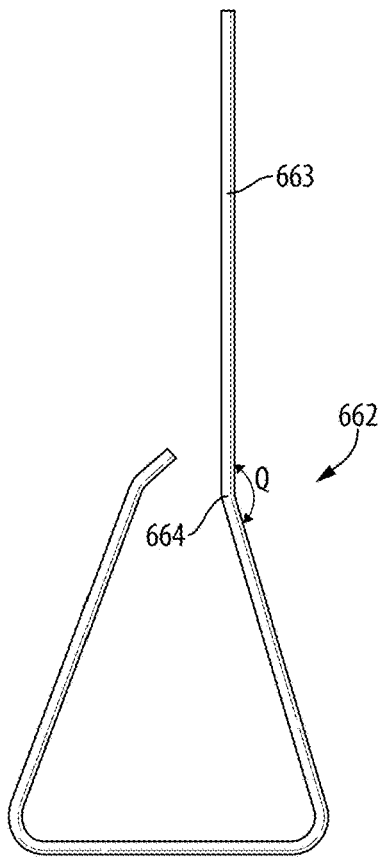
Figure 16D:
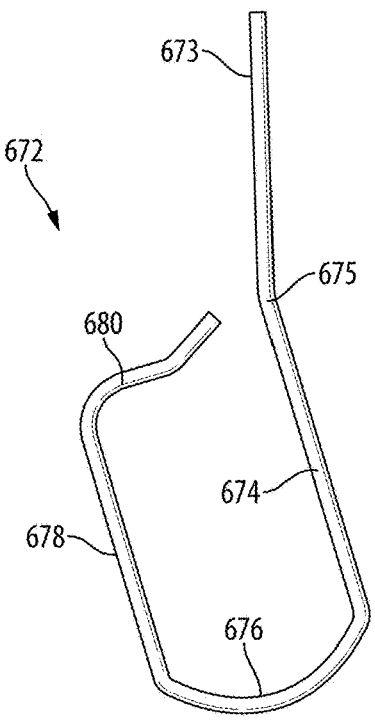

As illustrated in FIG. 16A, the cable holding loop 632 extends from intermediate arm section 603 to elbow 634, arm 636, elbow 638, arm 640, elbow 642, arm 644, elbow 646 and U-shaped hook end 648. While not shown for reasons of brevity, U-shaped hook end 648 may be similar to any of the U-shaped ends depicted in the above embodiments (e.g., see FIG. 1, U-shaped bend 134). U-shaped hook end 648 provides a smooth rounded surface at the opening 630 to the cable holding loop so that when cables are passed through opening 630 and received in cable holding loop 632, the cables are not nicked or otherwise damaged. The number and lengths of sides 632, 636, 640 and 644 may be selected depending among other things, on a number and size of cables that cable holding loop 632 is intended to hold. For example, as depicted in FIG. 16B, sides 653, 650 may be longer than sides 656, 654 such that a substantially vertical rectangular cable holding loop 652 is provided. Alternatively, sides 654, 656 may be made longer than sides 653, 650 such that a substantially horizontal rectangular cable holding loop is provided. In addition, the angles "P", "P'", "P''" and the number of sides forming the cable holding loop mau be other than as depicted in FIG. 16A. For example, as depicted in FIG. 16C, one or more of angles "P", "P'" "P''" may be less than 90 degrees forming a substantially triangular like cable holding loop 662 extending from intermediate arm section 663. Furthermore, the cable holding loop 662 may be offset from intermediate arm section 663 at elbow 664. The angle "Q" formed at elbow 664 may generally be between 90-270 degrees and preferably between 135-225 degrees. One or more sides forming the cable holding loop may be non-linear. For example, as depicted in FIG. 16D, cable holding loop 672 extends from intermediate arm section 673 and includes sides 674, 678, 680 which are substantially straight, while side 676 may be curved as shown. As shown in FIG. 16D, cable holding loop 672 may be offset from intermediate arm section 673 at elbow 675 similar to that as described above with respect to FIG. 16C.

Certain terminology may be used in the present disclosure for ease of description and understanding. Examples include the following terminology or variations thereof: top, bottom, up, upward, inner, outer, outward, down, downward, upper, lower, vertical, horizontal, etc. These terms refer to directions in the drawings to which reference is being made and not necessarily to any actual configuration of the structure or structures in use and, as such, are not necessarily meant to be limiting.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A hanger for securing electrical cabling to a structure, the hanger comprising:
    at least one section of wire comprising,
        a proximal end attachment portion comprising;
            a substantially U-shaped bend, the U-shaped bend comprising a first end extending to an end tip and a second end of the U-shaped bend extending to a first end of an elbow, the substantially U-shaped bend configured to be attached to a structure;
        an intermediate loop portion comprising a first end extending from a second end of the elbow and comprising a loop shaped bend configured to receive one or more electrical cables; and
        a distal end portion extending from a second end of the intermediate loop portion and comprising a substantially U-shaped bend,
    wherein the end tip comprises a flared end.

2. The hanger as recited in claim 1, further comprising a straight intermediate arm section between the U-shaped bend and the first end of the elbow.

3. The hanger as recited in claim 1, further comprising a straight arm segment between the second end of the elbow and the loop shaped bend.

4. The hanger as recited in claim 1, further comprising a straight arm segment between the second end of the intermediate loop portion and the distal end portion.

5. A hanger for securing electrical cabling to a structure, the hanger comprising:
    at least one section of wire comprising,
        a proximal end attachment portion comprising;
            a substantially U-shaped bend, the U-shaped bend comprising a first end extending to an end tip and a second end of the U-shaped bend extending to a first end of an elbow, the substantially U-shaped bend configured to be attached to a structure;
        an intermediate loop portion comprising a first end extending from a second end of the elbow and comprising a loop shaped bend configured to receive one or more electrical cables; and
        a distal end portion extending from a second end of the intermediate loop portion and comprising a substantially U-shaped bend,
    wherein the proximal end attachment portion is in a first plane, and the intermediate loop portion is in a second plane substantially perpendicular to the first plane.

6. The hanger as recited in claim 5, wherein the distal end portion is in a third plane different than the second plane.

7. The hanger as recited in claim 1, wherein the at least one section of wire comprises stainless spring steel.

8. A hanger for securing electrical cabling to a structure, the hanger comprising:
    at least one section of wire comprising,
        a proximal end section comprising,
            a first substantially U-shaped bend comprising a free proximal end and a distal end extending to a first elbow, the substantially U-shaped bend configured to be attached to a structure,
        a distal end section comprising,
            a second substantially U-shaped bend comprising a free distal end and a proximal end extending to a second elbow, and
        a loop section extending between the first elbow and the second elbow and configured to receive one or more electrical cables,
    wherein the free proximal end of the first substantially U-shaped bend comprises a flared end.

9. The hanger as recited in claim 8, wherein the distal end extending to the first elbow further comprises a straight intermediate arm segment.

10. The hanger as recited in claim 8, further comprising a straight arm segment between the first elbow and the loop section.

11. The hanger as recited in claim 8, further comprising a straight arm segment between the loop section and the second elbow.

12. The hanger as recited in claim 8, wherein the proximal end section is in a first plane.

13. The hanger as recited in claim 12, wherein the loop section is in a second plane different than the first plane.

14. The hanger as recited in claim 13, wherein the second plane is perpendicular to the first plane.

15. The hanger as recited in claim 14, wherein the distal end section is in a third plane different than the second plane.

16. The hanger as recited in claim 8, wherein the at least one section of wire comprises stainless spring steel.

* * * * *